(12) United States Patent
Law

(10) Patent No.: US 10,282,967 B2
(45) Date of Patent: May 7, 2019

(54) TIME-TEMPERATURE TRACKING LABEL

(71) Applicant: Avery Dennison Corporation, Glendale, CA (US)

(72) Inventor: Yuk Yu Law, Mentor, OH (US)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 15/501,884

(22) PCT Filed: Aug. 4, 2015

(86) PCT No.: PCT/US2015/043682
§ 371 (c)(1),
(2) Date: Feb. 6, 2017

(87) PCT Pub. No.: WO2016/022607
PCT Pub. Date: Feb. 11, 2016

(65) Prior Publication Data
US 2017/0229000 A1    Aug. 10, 2017

Related U.S. Application Data

(60) Provisional application No. 62/032,687, filed on Aug. 4, 2014.

(51) Int. Cl.
*G01K 1/02* (2006.01)
*G01K 3/04* (2006.01)
(Continued)

(52) U.S. Cl.
CPC .......... *G08B 21/182* (2013.01); *G01K 1/024* (2013.01); *G01K 3/04* (2013.01); *G06K 19/0717* (2013.01); *G06Q 10/087* (2013.01)

(58) Field of Classification Search
CPC .......... G06K 19/0717; G06K 19/0723; G06K 19/07707; G06K 19/07758;
(Continued)

(56) References Cited

U.S. PATENT DOCUMENTS

| | | | | | |
|---|---|---|---|---|---|
| 6,731,197 | B1 * | 5/2004 | Dejaeger | ............ | G06Q 20/201 235/383 |
| 7,276,675 | B2 * | 10/2007 | Faries, Jr. | ............ | A61M 5/445 219/413 |

(Continued)

FOREIGN PATENT DOCUMENTS

| | | |
|---|---|---|
| CN | 201662822 | 12/2010 |
| CN | 201892966 | 7/2011 |

(Continued)

OTHER PUBLICATIONS

"Good Storage and Distribution Practices for Drug Products," United States Pharmacopeia 36, taken from https://pharmacy.ks.gov/docs/default-source/default-document-library/ups-36-good-storage-and-shipping-practices.pdf, 8 pages, at least as early as Dec. 2013.

(Continued)

*Primary Examiner* — Fekadeselassie Girma
(74) *Attorney, Agent, or Firm* — Avery Dennison Retail Information Services, LLC

(57) ABSTRACT

A time-temperature tracking and indicator system including a laminated label and a computer application. The laminated label is capable of tracking and recording information associated with a product having a time-temperature threshold. If the time-temperature threshold is exceeded, the product is considered unsuited for its intended purpose. The information recorded by the label is wirelessly communicated from the label to the computer application for manipulation. One or more of the label and the computer application provides (Continued)

indication as to whether the time-temperature threshold of the product has been exceeded.

54 Claims, 8 Drawing Sheets

(51) Int. Cl.
    *G06K 19/07*    (2006.01)
    *G06Q 10/08*    (2012.01)
    *G08B 21/18*    (2006.01)

(58) Field of Classification Search
CPC .......... G06K 19/0776; G06K 7/10316; G06K 7/10366; B65D 2203/10; B65D 81/00; G07F 9/026; F25D 2500/06; F25D 2700/08; G01K 1/024; G01K 13/00; G01N 33/58; H04W 4/008; G01S 1/02; G07G 1/0045; G07G 1/009; G08B 13/1427; G08B 25/10; H01Q 1/22; H01Q 1/2225; H04H 60/90; H04L 43/10; H04L 67/18; H04M 1/7253; H04M 2250/02
See application file for complete search history.

(56) References Cited

U.S. PATENT DOCUMENTS

| | | | | |
|---|---|---|---|---|
| 7,612,325 | B1* | 11/2009 | Watkins, Jr. ........... | G01N 27/12 250/221 |
| 7,688,182 | B2* | 3/2010 | Nagai ................. | G06K 19/0717 340/10.41 |
| 8,164,420 | B2* | 4/2012 | Doan ................. | G06K 19/0716 340/10.1 |
| 9,411,989 | B2* | 8/2016 | Wild ...................... | F24C 7/082 |
| 9,640,061 | B1* | 5/2017 | Klimanis .............. | H04W 76/14 |
| 2002/0021208 | A1* | 2/2002 | Nicholson ............ | G06K 7/0008 340/10.34 |
| 2003/0034390 | A1* | 2/2003 | Linton ................... | G06Q 10/08 235/382 |
| 2004/0195308 | A1* | 10/2004 | Wagner .................. | B07C 7/005 235/375 |
| 2004/0199401 | A1* | 10/2004 | Wagner .................. | B07C 7/005 235/385 |
| 2004/0199545 | A1* | 10/2004 | Wagner .................. | B07C 7/005 |
| 2005/0067106 | A1* | 3/2005 | Melges ................. | B41J 3/4075 156/367 |
| 2005/0139686 | A1* | 6/2005 | Helmer ............ | G06K 19/06009 235/494 |
| 2006/0044110 | A1* | 3/2006 | Napolitano ........ | G06K 17/0022 340/5.92 |
| 2006/0192653 | A1* | 8/2006 | Atkinson ................ | G06F 21/88 340/5.61 |
| 2006/0214788 | A1* | 9/2006 | Ku ......................... | G06Q 50/22 340/539.26 |
| 2006/0227669 | A1* | 10/2006 | Pennaz ................... | G04F 13/04 368/327 |
| 2006/0261946 | A1* | 11/2006 | Himberger ......... | G06K 19/0717 340/572.1 |
| 2006/0290496 | A1* | 12/2006 | Peeters ................ | A61B 5/0002 340/572.1 |
| 2007/0096880 | A1* | 5/2007 | Nagai ................. | G06K 19/0717 340/10.41 |
| 2007/0096916 | A1* | 5/2007 | Liu ..................... | G06K 7/10178 340/572.7 |
| 2007/0176772 | A1* | 8/2007 | Nemoto ................ | G06K 7/0008 340/539.22 |
| 2008/0023362 | A1* | 1/2008 | Genosar ............. | B65D 33/2591 206/459.1 |
| 2008/0198011 | A1* | 8/2008 | Leper ................. | G08B 13/1445 340/572.1 |
| 2008/0283599 | A1* | 11/2008 | Rasband .............. | G06K 7/0008 235/439 |
| 2009/0159678 | A1* | 6/2009 | Day .................... | G06K 19/0701 235/439 |
| 2009/0281464 | A1* | 11/2009 | Cioanta ............. | A61M 37/0092 601/2 |
| 2010/0030379 | A1* | 2/2010 | Parlantzas .............. | B25J 9/0003 700/253 |
| 2010/0269454 | A1* | 10/2010 | Reddersen ............ | B65C 9/0015 53/411 |
| 2013/0217332 | A1* | 8/2013 | Altman .................. | H04H 60/90 455/41.2 |
| 2013/0256175 | A1* | 10/2013 | Wilkinson ............. | B65D 5/563 206/459.1 |
| 2014/0055244 | A1 | 2/2014 | Burchell et al. | |
| 2014/0232519 | A1* | 8/2014 | Allen ................. | G06Q 30/0283 340/5.9 |
| 2014/0268304 | A1* | 9/2014 | Dagdelen Uysal ..... | G02F 1/167 359/296 |
| 2014/0284239 | A1* | 9/2014 | Espinosa ................ | B65D 81/00 206/459.5 |
| 2014/0316561 | A1* | 10/2014 | Tkachenko ........... | G07F 11/002 700/236 |
| 2014/0333439 | A1* | 11/2014 | Downing .............. | A01K 29/005 340/573.3 |
| 2015/0199893 | A1* | 7/2015 | St. Germain .......... | B66C 15/00 340/539.1 |
| 2015/0223731 | A1* | 8/2015 | Sahin ...................... | A61B 5/16 600/301 |
| 2015/0310385 | A1* | 10/2015 | King .................... | G06Q 10/087 705/28 |
| 2015/0310601 | A1* | 10/2015 | Rodriguez ............ | G06T 1/0007 348/150 |
| 2017/0039511 | A1* | 2/2017 | Corona ................ | G06K 9/6267 |
| 2017/0042466 | A1* | 2/2017 | Yamasaki .............. | A61B 5/026 |
| 2017/0147915 | A1* | 5/2017 | Butler ................. | H04L 67/1097 |
| 2017/0228519 | A1* | 8/2017 | Chu ................... | G06K 17/0022 |

FOREIGN PATENT DOCUMENTS

| | | |
|---|---|---|
| CN | 202736090 | 2/2013 |
| CN | 203652361 | 6/2014 |

OTHER PUBLICATIONS

International Search Report and Written Opinion dated Oct. 29, 2015 issued in corresponding IA No. PCT/US2015/043682 filed Aug. 4, 2015.
International Preliminary Report on Patentability dated Feb. 16, 2017 issued in corresponding IA No. PCT/US2015/043682 filed Aug. 4, 2015.

* cited by examiner

TIME-TEMPERATURE TRACKING LABEL

CROSS-REFERENCE TO RELATED APPLICATION

The present application is a 371 of International Application No. PCT/US2015/043682, which was published in English on Feb. 11, 2016, and claims the benefit of U.S. Provisional Patent Application No. 62/032,687 filed Aug. 4, 2014, both of which are incorporated herein by reference in their entireties.

FIELD

The present subject matter relates to a time-temperature tracking and indicator system used to monitor and record information associated with a perishable product and indicate if the product is suitable for its intended use. More specifically, the present subject matter relates to time-temperature tracking and recording labels, and related computer applications, used in combination to monitor temperature exposure of pharmaceuticals and to determine if the pharmaceuticals are acceptable for use and provide an indication thereof.

BACKGROUND

The use of radio frequency identification (RFID) tags to track, identify and locate goods has grown significantly in recent years. RFID tags allow manufacturers, distributors and retailers, amongst others, to regulate products and inventory, quickly determine production, manufacture, distribution or retail needs and efficiently intake and remove items utilizing RFID tags from inventory or other supply chain situations. The RFID tags themselves can provide any desired product data and may be scanned or read in any of a variety of manners through the use of any device that has a reader or scanner.

Near-field communication (NFC) is a type of radio frequency communication technology, which allows for read-only and read-write communications between a NFC-enabled RF tag reader and a NFC-enabled tag. NFC operation is based on inductive coupling between two loop antennas, which allows for sharing of power and data between NFC-enabled devices.

Systems using bar codes or RFID devices have been used to track articles such as in parcel delivery or inventory management systems. However, such devices and associated systems are typically proprietary or designed for very specific applications and do not adequately indicate if the time-temperature threshold of a product has been exceeded. Although a variety of tracking systems are known in the art, a need still remains for a cost effective method of tracking information associated with a product having a time-temperature threshold.

SUMMARY

The difficulties and drawbacks associated with previously known means and strategies are addressed in the present subject matter and related combinations and methods.

The present subject matter relates to a tracking and indicator system for a perishable product such as pharmaceuticals, food stuffs, or other products that may become unsuited for their intended purpose when exposed to certain conditions exceeding a predetermined threshold. In accordance with the present subject matter, the tracking and indicator system tracks and records information that is related to the time-temperature threshold of the product. The system outputs information relating to whether the time-temperature threshold of the product has been exceeded in order to indicate if the product is unsuited for its intended use.

In one aspect, the present subject matter provides a time-temperature tracking and indicator system for a product having a time-temperature threshold. The system comprises a laminated label and a computer application. The laminated label is configured to be attached to packaging for the product and includes a facestock, a microchip, a communication apparatus, an indicator, and a power source. The facestock comprises printed indicia. The microchip is configured to record information associated with the product, the information including at least one of time data and temperature data associated with the product. The communication apparatus is configured to wirelessly communicate the information stored in the microchip to a computing device. The indicator is configured to display an initial status and a secondary status, and to provide a permanent visual indication as the secondary status for indicating that the time-temperature threshold of the product has been exceeded. The power source is for powering the microchip, the indicator, and optionally the communication apparatus. The computer application is executable on the computing device and configured to create manipulated information by performing operations on the information communicated to the computing device by the communication apparatus, and to output the manipulated information in order to indicate if the time-temperature threshold of the product has been exceeded.

In another aspect, the present subject matter provides a method of determining if a time-temperature threshold of a perishable product has been exceeded. The method comprises providing a time-temperature tracking and indicator system comprising an activatable laminated label and a computer application. The laminated label comprises a facestock comprising printed indicia, a microchip, communication apparatus, an indicator, and a power source for powering the microchip, the indicator, and optionally the communication apparatus. The method includes activating the laminated label such that the microchip records information associated with the product only when a temperature of the product, or a temperature to which the product is exposed, is not a recommended temperature. The information includes at least one of time data and temperature data associated with the product. The microchip actuates the indicator to provide a permanent visual indication when the time-temperature threshold of the product has been exceeded. The method includes attaching the laminated label to packaging for the product. The method also includes establishing communication between the communication apparatus and a separate computing device whereby the information stored in the microchip is wirelessly communicated to the computing device. The method also includes executing the computer application on the computing device, whereby the computer application creates manipulated information by performing operations on the information communicated to the computing device. The computer application outputs the manipulated information to the computing device. The computing device displays the manipulated information. The method also includes assessing at least one of the indicator and the manipulated information displayed on the computing device, in order to determine if the time-temperature threshold of the product has been exceeded.

In another aspect, the present subject matter provides a method of compiling information relating to a perishable product contained in a series of packages and having a time-temperature threshold. The method comprises providing a time-temperature tracking and indicator system comprising a plurality of laminated labels and a computer application executable on a computing device. The laminated labels each comprise a facestock including printed indicia, a microchip, a communication apparatus, an indicator, and a power source for powering the microchip, the indicator, and optionally the communication apparatus. The method comprises attaching one of the laminated labels to each package in the series of packages. The method also comprises activating the laminated labels such that the microchip records information associated with the product only when a temperature of the product, or a temperature to which the product is exposed, is not a recommended temperature. The information includes at least one of time data and temperature data associated with the product. The microchip actuates the indicator to provide a permanent visual indication when the time-temperature threshold of the product has been exceeded. The method also comprises establishing communication between the computing device and the communication apparatus, whereby the information stored in the microchip is wirelessly communicated to the computing device. The method also comprises executing the computer application on the computing device whereby the information communicated to the computing device is communicated to a database to thereby compile the information relating to the product contained in the series of packages.

The present subject matter provides a time-temperature tracking system that is easily operable and configured to allow convenient monitoring of a perishable product through various stages of transportation, delivery, and use of the product.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

These, as well as other features, aspects, and advantages of the present subject matter, will be more completely understood and appreciated by referring to the following more detailed description of the exemplary embodiments of the present subject matter in conjunction with the accompanying drawings.

DETAILED DESCRIPTION OF THE EMBODIMENTS

Figure 1:
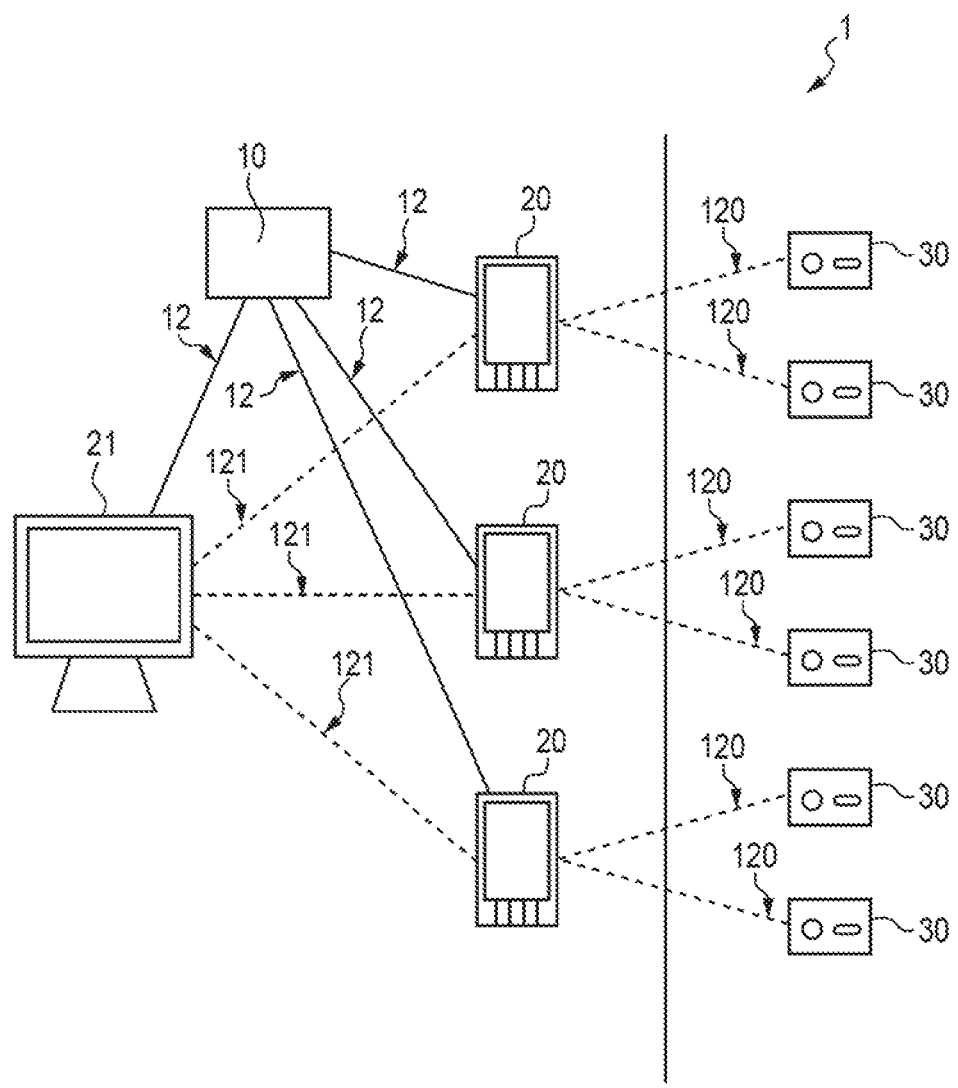
FIG. 1 is a schematic view of a time-temperature tracking system in accordance with the present subject matter.

The present subject matter provides a tracking and indicator system for perishable products having a time-temperature threshold. Pharmaceuticals are one type of perishable product having a time-temperature threshold, such that they are subject to degradation and become unsuited for an intended use when exposed to temperatures outside a recommended temperature range for more than a predetermined amount of time. The tracking and indicator system of the present subject matter tracks and records information that relates to the time-temperature threshold of the product and indicates whether the time-temperature threshold of the product has been exceeded and is unsuited for its intended use.

By "time-temperature threshold" it is meant a threshold established for the product that is based on various combinations, relationships, and/or computations relating to a time component and a temperature component associated with the product. The time-temperature threshold of a product will be discussed in more detail herein. By "intended use" it is meant the recommended use of the product as established by the manufacturer or distributor.

In one embodiment, the system of the present subject matter includes a laminated label. The laminated label is configured to track and/or record the information associated with the product, such as for example, the time and temperature to which the product is exposed. In certain embodiments, the laminated label is configured to perform calculations on the information. The laminated label is configured to be attached to the product, or to packaging for the product, for tracking and recording the information. In one aspect, the laminated label is configured to display whether or not the product is suitable for its intended use based on the information.

In another embodiment the system further includes a computer application. In this embodiment, the laminated label is configured to communicate the information to the computer application, such that the computer application is able process or manipulate the recorded information. The computer application then outputs the manipulated information for analysis in order to indicate whether the time-temperature threshold of the product has been exceeded. In this embodiment, the laminated label may or may not also be configured to display if the product is suitable for its intended use.

In certain embodiments where the label is configured to transfer the information to the computer application, the tracking and indicator system of the present subject matter includes a computing device that is configured to execute the computer application, and is able to communicate with the label for accessing the information recorded by the label. The information recorded by the label is communicated to the computing device, wherein the computer application processes the information. The computer application is configured to manipulate the information and output the manipulated information for display on the computing device, or by other means such as by another computing device or by generating a printed report for example.

In certain embodiments, the label is the only component that provides indication as to whether or not the time-temperature threshold of the product has been exceeded. In other words, the label acts as an indicator for the current status of the product, wherein the microchip tracks and records time-temperature data associated with the product, and triggers the indicator to display an unacceptable product indication if the time-temperature threshold has been exceeded. In other embodiments, the computer application is the only component provides an indication as to whether or not the time-temperature threshold of the product has been exceeded. In other words, the label acts to track the time-temperature information associated with the product, and communicates such information to the computer application so that the computer application can indicate an unacceptable product indication if the time-temperature threshold has been exceeded. In still other embodiments, both the label and the computer application provide such indication. In other words, the label has the dual function of acting as an indicator for the current status of the product and for tracking the time-temperature information associated with the product for communication to computer application.

The system can also optionally include the product having a time-temperature threshold, and if necessary or desired, packaging for the product. The various components of the time-temperature tracking and indicator system of the present subject matter will be described in more detail herein in reference to the figures.

In one embodiment and in reference to FIG. 1, the system 1 includes a plurality of labels 30, one or more optional computing devices 20, an optional central computing device 21, and an optional computer application 10. In accordance with the present subject matter, the labels can be associated with a product, or with product packaging. The labels 30 may be in communication with the one or more computing devices via communication channels 120. Further, the computer application 10 is schematically depicted by solid lines 12 to be executed on each computing device 20 and optionally the central computing device 21. The several computing devices 20 that are in direct communication with the labels 30 are also in communication with the central communication device 21 via communication channels 121.

The central computer device 21 or the computer application 10 may include artificial intelligence and perform automatic data analysis, and can provide supply chain adjustments or trigger re-orders based on the uploaded data from the labels 30 via computing devices 20. Additionally, the central computer device or computer application may alternatively or additionally provide assurance and pricing information/recommendations for the insurance industry based on the uploaded data from the labels 30 via the computing devices 20.

Product

In one embodiment, the product of the present subject matter to which the one or more labels 30 is associated, comprises a perishable product; and in one aspect, is a pharmaceutical drug or other temperature sensitive biologic. However, the products are not particularly limited by the present subject matter, and can include other consumable or non-consumable products having time-temperature thresholds and other thresholds.

Figure 8:
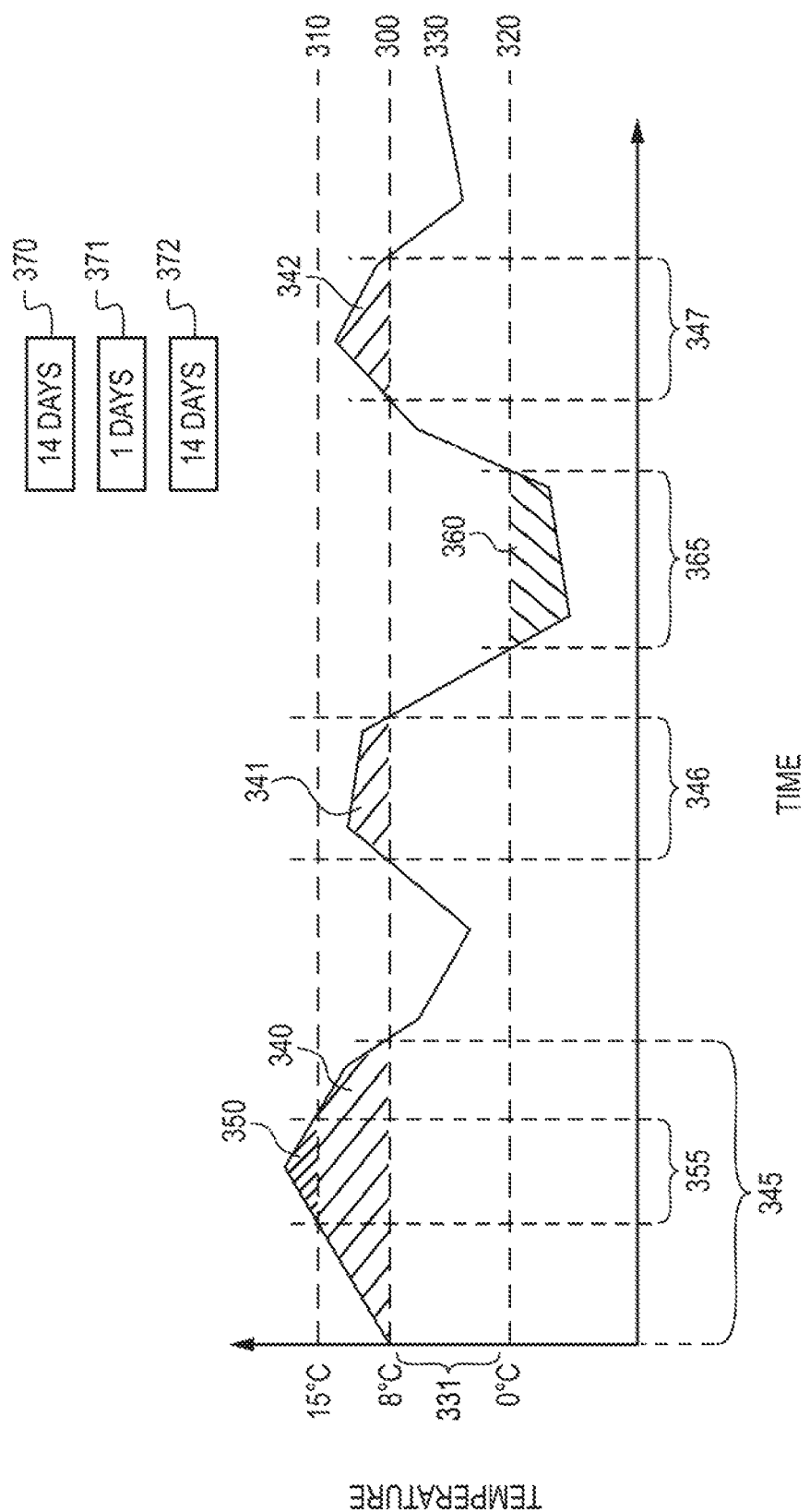
FIG. 8 is a graph of temperature versus time associated with a product having a time-temperature threshold in accordance with the present subject matter.

The time-temperature threshold of the product will be explained in more detail in reference to FIG. 8. Therein, an example of a product's recorded temperature 330 graphed relative to time is depicted. The time-temperature plot depicted in FIG. 8 includes an upper temperature threshold 300, an extreme upper temperature threshold 310, a lower temperature threshold 320, and a recommended temperature 331 established for the product. FIG. 8 also includes an upper temperature time threshold 370, an extreme upper temperature time threshold 371, and a lower temperature time threshold 372 established for the product.

The upper temperature threshold 300 for the product comprises a temperature, above which the product cannot measure (or be exposed) for more than the upper temperature time threshold 370 without being rendered unsuited for its intended purpose. The extreme upper temperature threshold 310 comprises a temperature above which the product cannot measure (or be exposed) for more than the extreme upper temperature time threshold 371 without being rendered unsuited for its intended purpose. The lower temperature threshold 320 for the product comprises a temperature, below which the product cannot measure (or be exposed) for more than the lower temperature time threshold 372 without being rendered unsuited for its intended purpose. In one embodiment, the upper temperature threshold, the extreme upper temperature threshold, the lower temperature threshold, the upper temperature time threshold, the extreme upper temperature time threshold, and the lower temperature time threshold can be adjusted or modified as desired for a particular application.

The portion of the line representing the product's recorded temperature 330 that abuts the three shaded areas 340 (including area 350), 341, and 342 depicts that the product's temperature was above the upper temperature threshold 300 for times 345 (including time 355), 346, and 347. The portion of the line representing the product's recorded temperature 330 that abuts the shaded area 350 depicts that the product's temperature was above the extreme upper temperature threshold 310 for time 355. The portion of the line representing the product's recorded temperature 330 that abuts the shaded area 360 depicts that the product's temperature was below the lower temperature threshold 320 for time 365.

In one embodiment, and in accordance with the present subject matter, the time-temperature threshold of a product is established as a combination of an upper temperature threshold 300, for example 8° C., with an upper temperature time threshold 370, for example 14 days. In this embodiment, and with reference FIG. 8, the time-temperature threshold of the product is exceeded if the product is exposed to a temperature over 8° C. for a cumulative amount of time longer than 14 days. That is, if times 345 (including time 355), 346, and 347 are added together and exceed 14 days, then the time-temperature threshold is exceeded and the product is considered unsuited for its intended purpose.

In another embodiment, and in accordance with the present subject matter, the time-temperature threshold of a product is established as a combination of an extreme upper temperature threshold 310, for example 15° C., with an extreme upper temperature time threshold 371, for example 1 day. In this embodiment, and with reference FIG. 8, the time-temperature threshold of the product is exceeded if the product is exposed to a temperature over 15° C. for a cumulative amount of time longer than 1 day. That is, if time 355 exceeds 1 day, then the time-temperature threshold is exceeded and the product is considered unsuited for its intended purpose.

In another embodiment, and in accordance with the present subject matter, the time-temperature threshold of a product is established as a combination of a lower temperature threshold 320, for example 0° C., with a lower temperature time threshold 372, for example 14 days. In this embodiment, and with reference FIG. 8, the time-temperature threshold of the product is exceeded if the product is exposed to a temperature below 0° C. for a cumulative amount of time longer than 14 days. That is, if time 365 exceeds 14 days, then the time-temperature threshold is exceeded and the product is considered unsuited for its intended purpose.

In another embodiment, the time-temperature threshold of the product is established as a predetermined area value (A1), wherein the time-temperature threshold of the product is exceeded if the area that lies above the upper temperature threshold 300 and below the product's recorded temperature 330 is cumulatively greater than the predetermined area value (A1). In this embodiment, and in reference to FIG. 8, if the cumulative area of shaded areas 340 (including area 350), 341, and 342 is greater than the predetermined area value (A1), then the time-temperature threshold of the product has been exceeded and the product is considered unsuited for its intended purpose.

In another embodiment, the time-temperature threshold of the product is established as a predetermined area value (A2), wherein the time-temperature threshold of the product is exceeded if the area that lies above the extreme upper temperature threshold 310 and below the product's recorded temperature 330 is cumulatively greater than the predetermined area value (A2). In this embodiment, and in reference to FIG. 8, if the area of shaded area 350 is greater than the predetermined area value (A2), then the time-temperature threshold of the product has been exceeded and the product is considered unsuited for its intended purpose.

In another embodiment, the time-temperature threshold of the product is established as a predetermined area value (A3), wherein the time-temperature threshold of the product is exceeded if the area that lies below the lower temperature threshold 320 and above the product's recorded temperature 330 is cumulatively greater than the predetermined area value (A3). In this embodiment, and in reference to FIG. 8, if the area of shaded area 360 is greater than the predetermined area value (A3), then the time-temperature threshold of the product has been exceeded and the product is considered unsuited for its intended purpose.

Other conventions relating to time and temperature can be used to establish the time-temperature threshold of a product. Further, various combinations of these, and other time-temperature thresholds can be utilized to determine if a product is suited for its intended use. Additionally, thresholds based on variables other than time and temperature can be utilized; such as for example, thresholds based on exposure to various types of radiation, turbulence, pressure variations, atmospheric contamination, moisture, and the like.

Label

Figure 2:
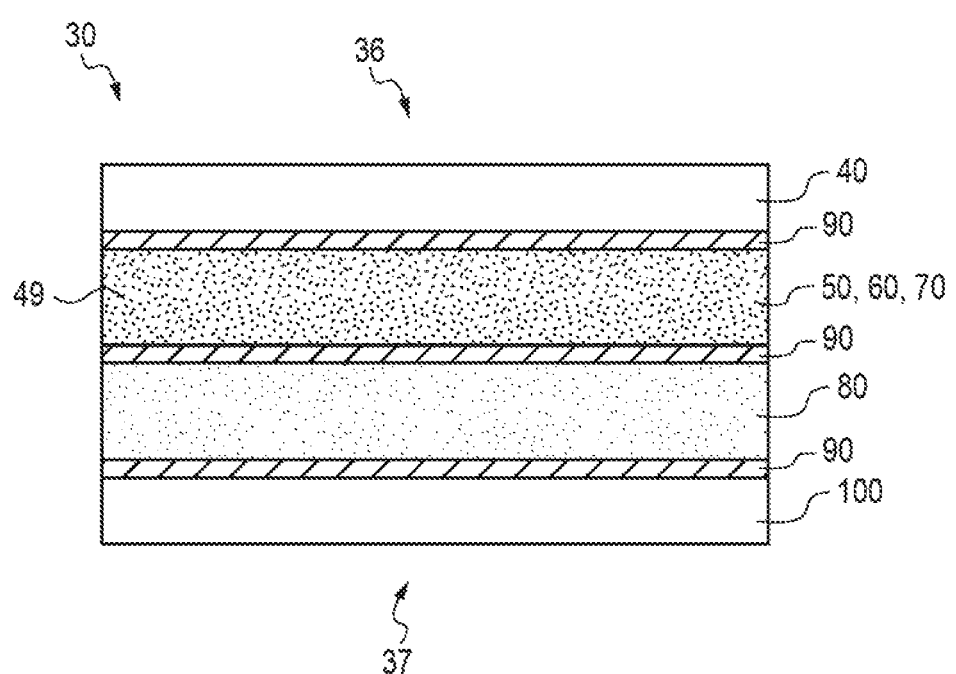
FIG. 2 is a schematic, cross-sectional view of a laminated label with a release liner, in accordance with the present subject matter.
Figure 3:
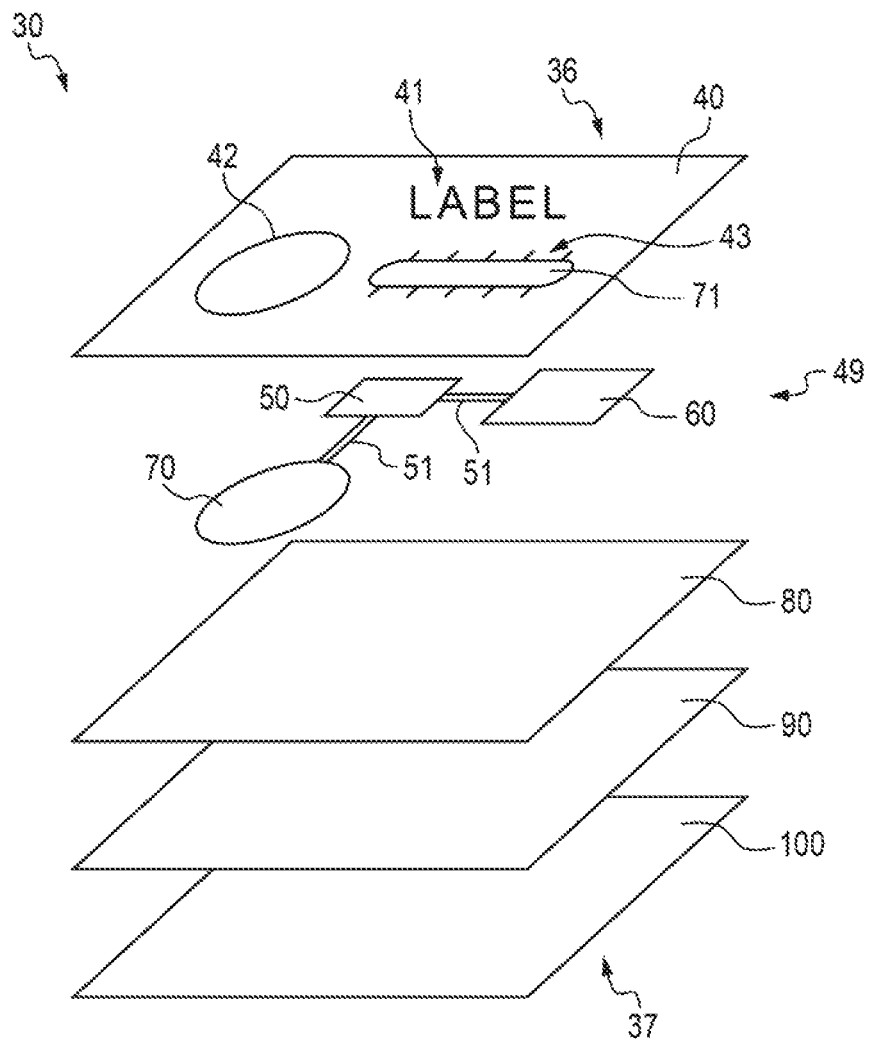
FIG. 3 is a schematic, exploded perspective view of a laminated label in accordance with the present subject matter.
Figure 4:
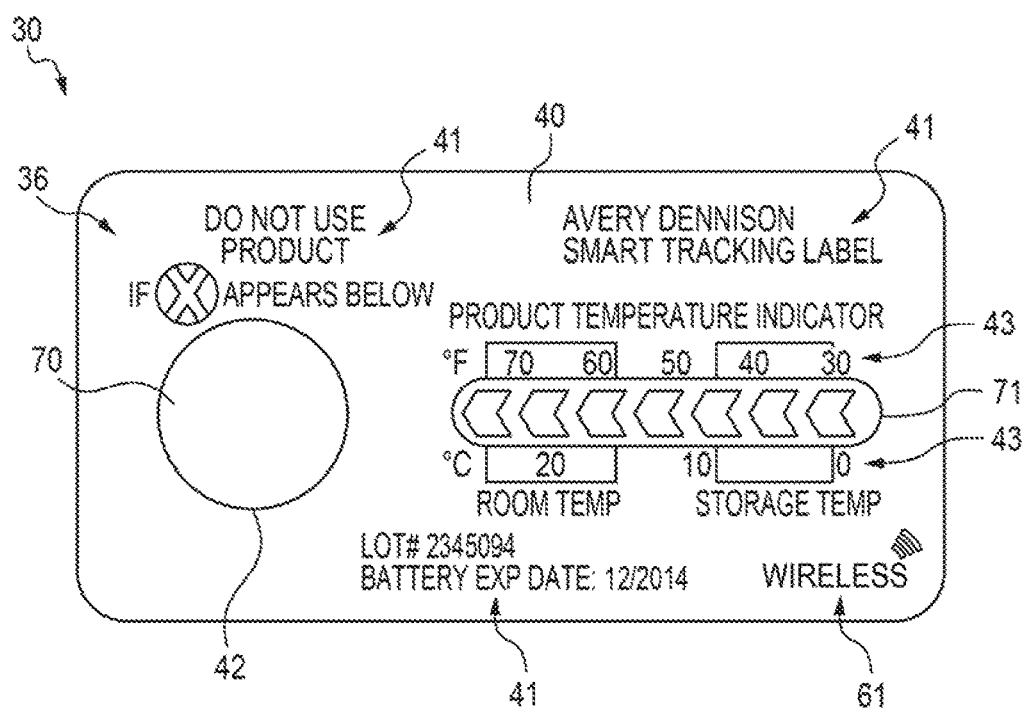
FIG. 4 is a schematic, top view of another laminated label in accordance with the present subject matter.

In one embodiment in accordance with the present subject matter, and in reference to FIGS. 2, 3, and 4, the laminated label 30 can comprise various components including a face stock 40, a microchip 50, a communication apparatus 60, an indicator 70, a power source 80, and at least one adhesive layer 90. For purposes of clarity, only a single adhesive layer 90 is shown in the schematic view of FIG. 3. The adhesive layer 90 of the label 30 can be a clean-removable and re-usable pressure sensitive adhesive configured for application on a variety of substrates, including the metal surfaces.

The laminated label can be used as a stand-alone product, or can be used as part of the tracking and indicator system in accordance with the present subject matter. When used alone, the label includes visual indicators to indicate the current status of the product, including a visual indication as to whether the time-temperature threshold of the product has been exceeded. When used as part of the tracking and indicator system, the label may be configured to communicate the recorded information to a computing device for use by the computer application and may also optionally include visual indicators.

In one embodiment, the label comprises flexible components such that the label can be attached to various shaped and contoured substrates. In this embodiment, the facestock 40, indicator 70, power source 80, and adhesive layers 90 are flexible. The flexible power source can include a flexible battery. The flexible power source 80 may be incorporated into the facestock 40 and may be a light energy harvesting device that captures solar energy, including a device based on amorphous-silicon spray technologies. Alternatively, the light energy harvesting device can also be used as sunlight or light-period detectors. The power source 80 may also include a power storage component, including capacitors, super-capacitors, traditional and re-chargeable batteries, and external power sources (including radio-frequency based wireless charging and energy harvesting, magnetic induction, solar power, thermal energy, wind energy, osmotic power, chemical potential and kinetic energy. The various layers and components of the laminate label will be discussed in more detail below.

In one embodiment, as depicted in FIG. 2, the label 30 can be a laminated label comprising several layers and defining a front/top/outer portion 36 of the label and an opposite back/bottom/inner portion 37 of the label. In one embodiment, the label includes a face stock 40; a component layer 49 comprising a microchip 50, and one or both of a communication apparatus 60, and an indicator 70; a power source 80; and a release liner 100. As depicted in FIG. 2, the label can be laminated, whereby the various layers of the label 30 are laminated with one or more adhesive layers 90. Alternatively, the microchip 50 of the component layer 49 can also be attached on the back side of the component layer 49 and still be connected to the other components (e.g. the indicator 70 and communication apparatus 60) on the top side of the component layer 49 and the electrical connections 51 by assembly techniques, such as the through-hole technology. Other forms of connection arrangements and assembly techniques allowing the equivalent should be included also In aspects where the indicator 70 is included and the communication apparatus 60 is excluded, the label can be used to provide a visual indication whether the product's time-temperature threshold has been exceeded. In aspects where the communication apparatus 60 is included and the indicator 70 is excluded, a computer application 10 or computing device 20 can be used to communicate with the label to provide an indication whether the product's time-temperature threshold has been exceeded. In aspects where both the communication apparatus 60 and the indicator 70 are included, one or both of the label 30 and the computing device 20 can be used to provide an indication whether the product's time-temperature threshold has been exceeded.

In one embodiment as shown in FIG. 3, the label includes a face stock 40 having indicia 41 printed thereon, one or more windows/apertures 42, and in one aspect, a temperature scale 43. The face stock can also include one or more indicators 71 that are used in conjunction with the temperature scale 43 to provide an indication of the product's current temperature. The indicators 71 can be made by the printing of thermochromic ink, electrochromic ink, or other thermochromic materials such as cholesteric liquid crystal inks and pigments, for example. As the temperature of the product or of the surrounding environment changes, the thermochromic ink will indicate the current temperature of the product on the temperature scale 43. Where electrochromic ink is used, the computer chip can control an amount of electricity delivered to the ink so that the electrochromic ink will indicate the current temperature of the product on the temperature scale 43. Although FIG. 3 depicts a label 30 including both an indicator 70 and a communication apparatus 60, it will be understood that labels in accordance with the present subject matter may optionally include only one of the indicator and communication apparatus and may, but does not necessarily, include both an indicator 70 and a communication apparatus 60.

In one embodiment, the label comprises the communication apparatus and does not comprise a visual indicator. In another embodiment, the label comprises the indicator and does not comprise a communication apparatus. In still another embodiment, the label comprises both the indicator and the communication apparatus.

FIG. 4 depicts one embodiment in accordance with the present subject matter, wherein label 30 is depicted as it would appear in common use, adhered to a substrate such that the front portion 36 of the label 30 is visible. As shown, the label 30 can include various indicia 41 printed on the face stock 40. The indicia can include instructions for using the product, instruction for using or reading the label, company identification information, information about the supplier of the product, the manufacturer of the product, a communication apparatus indicator 61 for indicating that the label includes a communication apparatus 60, product information such as a lot number or production date for example, instructions for reading the label, and the expiration date of the label or battery.

FIG. 4 depicts the face stock including one or more indicators 71, such as thermochromic ink or electrochromic ink for example, herein depicted as a thermometer having Celsius and Fahrenheit temperature scales associated thereto. On the left hand side of the label as shown, a window 42 is provided such that an indicator 70 included in the component layer 49, can be seen from the front 36 of the label through the facestock 40. The number of windows 42, indicators 70, 71, and type and styling of indicia 41 is not limited to those depicted in FIG. 4, but can encompass various alterations, combinations, additions, and subtractions from those depicted.

The laminated label of the present subject matter can also include functions to track other information associated with the product. For example, the label can include other sensors within the label to measure information associated with the product, such as turbulence, mineral sensing, exposure to solar or UV radiation, pressure, moisture, etc. The other tracking components can communicate the tracked information to the microchip for recording and transmittal to the computing device by the computing apparatus.

In accordance with the present subject matter, the label can also be reused for another product or on another package, wherein the microchip is configured to be reprogrammed, such as by deleting the information recorded thereon and rewriting or replacing an algorithm that controls the microchip. Further, the power source can be configured to be recharged or replaced; and the indicator, which provides the permanent visual indication, can be reset or replaced for subsequent use.

Facestock

The face stock 40 of the laminated label is not particularly limited, and can comprise one or more film layers comprising one or more polymers or copolymers, paper, metal foils, or textiles. Suitable polymers may include polypropylene, polyethylene, polyethylene terephthalate, acrylonitrile butadiene styrene, nylon, polystyrene, and other extrudable thermo-plastics. The facestock can include fillers, stabilizers, colorants, or other additives in order to enhance certain characteristics of the film such as chemical resistance, color, durability, anti-blocking, or the like.

The polymeric components of the facestock can be machine direction oriented, transverse direction oriented, or biaxially oriented. Biaxially oriented film will be more resistant to tearing, ripping, or otherwise being damaged. The thickness facestock of the facestock is not particularly limited can range from about 10 microns to about 100 microns.

The facestock can optionally include other layers or coatings for specific intended uses including printing receptive layers or coatings, hydrophobic layers or coatings, additional facestock layers, or the like.

In an embodiment, the facestock comprises the upper portion of the laminated label and can be printable or contain printing, images, or other indicia. In one aspect, the face stock includes printed indicia 41, indicators 71, and one or more apertures 42, as previously described. Other indicia, indicators, and apertures can be included as desired in accordance with the present subject matter. In several embodiments, the face stock 40 acts as a protective front layer for the underlying component layer 49.

Microchip

As shown in FIG. 3, the label 30 also includes a microchip 50. The microchip is configured to control certain functions of the laminated label. In one embodiment the microchip of the present subject matter includes a real time clock, a temperature sensor, data memory, and algorithms for controlling functions of the microchip and label, and for computing information (i.e. performing calculations on the information). In combination, the various components of the microchip allow it to track and record the information associated with the product, such as temperature and/or time data, and to perform calculations on the information. This information is stored/recorded in the data memory of the microchip for accessing, computing, and communicating purposes. For purposes of example, the microchip may be the SL13A and SL900A available from ams AG, Tobelbbader Strasse 30, 8141 Unterpremstaetten, Austria; the NHS3100 available from NXP Semiconductors NV, High Tech Campus 60, Eindhoven, 5656 AG, The Netherlands; the THOR available from DELTA Microelectronics, Venlighedsvej 4, 2970 Horsholm, Denmark; the RF430FRL152H available from Texas Instruments, 12500 TI Boulevard, Dallas, Tex., and equivalents and or combinations thereof.

In one embodiment, the embedded microchip 50 has sufficient capacities to support recording and logging of information associated with the product for at least about 3 years of operation after the label is activated. Such information may relate to time-temperature data logging and computation. In one aspect, the memory capacity of the microchip can be increased by adding memory microchips to the device circuit either before or after the label is assembled.

The embedded microchip 50 supports on-board computation of the stored time-temperature data as desired, such computation being based on software and/or data calculation algorithms stored in the microchip. The software and data calculation algorithms can be pre-installed in the microchip before the label 30 is assembled. Alternatively or additionally, the microchip 50 can be programmable, wherein the software and data calculation algorithms can be installed, modified, erased, or replaced after assembly of the label 30. For example, the microchip may be programmable through communication with a programming device, such as by near field-communication (NFC) with an RFID programming device.

The microchip 50 can contain a unique identification (UID); and the computing device 20 can also contain a UID and provide the global positioning system (GPS) function. The central computing devices 21 can receive the UIDs of the microchip 50 and computing device 20, time and location information of the label 30 and computing device 20 when the computing device 20 communicate with the label 30. These features can be applied for the track and trace of product shipments, and also can be applied for the serialization in pharmaceuticals, including the new regulations on supply chain security and the chain-of-custody. It is also envisioned that the UID of microchip 50 can be used for anti-counterfeiting applications.

In one embodiment, the data calculation algorithms provide a mean kinetic temperature (MKT) calculation as disclosed in *United States Pharmacopeia*, 36, <1079> *Good Storage and Distribution Practices for Drug Products*. As disclosed therein, the mean kinetic temperature (MKT) is the single calculated temperature at which the total amount of degradation of a product over a particular period is equal to the sum of the individual degradations that would occur at various temperatures, and may be represented by the following equation:

$$T_k = \frac{\Delta H / R}{-\ln\left(\frac{e^{-\Delta H/RT_1} + e^{-\Delta H/RT_2} + \ldots + e^{-\Delta H/RT_n}}{n}\right)}$$

$T_k$=mean kinetic temperature
$\Delta H$=the heat of activation, 83.144 kJ·mole$^{-1}$ (unless more accurate information is available from experimental studies)
R=the universal gas constant, 0.0083144 kJ·K$^{-1}$·mole$^{-1}$
$T_i$=the value for the temperature recorded during the $i^{th}$ time period (i=1, 2, . . . , n)
n=total number of storage temperatures recorded during the observation period
[Note—All temperatures, T, are absolute temperatures in degrees Kelvin (K)].

In another embodiment, and with specific reference to the time-temperature plot in FIG. 8, the data calculation algorithms provide a value (i.e. area) for one or more of the shaded areas 340 (including or excluding area 350), 341, 342, 350 (exclusive of area 340), and 360, by performing an integration of the area between the line 330 and one of the lines 300, 310, and 320. Such calculations of these shaded areas generally correspond to the amount of time and magnitude of temperature deviation above the upper temperature threshold 300 or extreme upper temperature threshold 310; or below the lower temperature threshold 320.

Such data calculation algorithms used to calculate the value of the shaded areas 340, 341, 342, 350, and 360 can include performing a Riemann Sum calculation, i.e. trapezoidal rule calculation, which is a rudimentary integration that can be used to calculate the shaded areas in the time-temperature plot (FIG. 8). For example a total area ($A_U$) in a temperature-time plot that corresponds to an exposure time ($t_i$) of merchandise at temperature ($T_i$) higher than an upper temperature threshold ($T_U$) can be calculated with the following equation:

$$A_U = \sum_{i=1}^{n} \frac{t_i - t_{i-1}}{2} \cdot (T_i + T_{i-1} - 2 \cdot T_U)$$

In one aspect, and in reference to FIG. 8, total area ($A_U$) can be the combined total of shaded areas 340 (including area 350), 341, and 342; exposure time ($t_i$) can be the combined total of time 345 (including time 355), 346, and 347; temperature ($T_i$) can be the temperature of the product 330; and the upper temperature threshold ($T_U$) can be upper temperature threshold 300. In one embodiment, when time ($t_i$) is zero, i.e. $t_i$=$t_0$, this will be understood to be the first time that the merchandise reaches a temperature equal to the upper temperature threshold $T_u$, i.e. $T_0$=T($t_0$)=$T_u$.

A total area ($A_E$) in a temperature-time plot that corresponds to an exposure time ($t_i$) of the merchandise at a temperature ($T_i$) higher than an extreme upper temperature threshold ($T_E$) can be calculated, for example, with the following equation:

$$A_E = \sum_{i=1}^{n} \frac{t_i - t_{i-1}}{2} \cdot (T_i + T_{i-1} - 2 \cdot T_E)$$

In one aspect, and in reference to FIG. 8, total area ($A_E$) can be the shaded area 350; exposure time ($t_i$) can be the time 355; temperature ($T_i$) can be the temperature of the product 330; and the extreme upper temperature threshold ($T_E$) can be extreme upper temperature threshold 310.

A total area ($A_L$) in a temperature-time plot that corresponds to an exposure time ($t_i$) of the merchandise at a temperature ($T_i$) lower than an lower temperature threshold ($T_L$) can be calculated, for example, with the following equation:

$$A_L = \sum_{i=1}^{n} \frac{t_i - t_{i-1}}{2} \cdot (2 \cdot T_L - (T_i + T_{i-1}))$$

In one aspect, and in reference to FIG. 8, total area ($A_L$) can be the shaded area 360; exposure time ($t_i$) can be the time 365; temperature ($T_i$) can be the temperature of the product 330; and the lower temperature threshold ($T_L$) can be lower temperature threshold 320. In one embodiment, when time ($t_i$) is zero, i.e. $t_i$=$t_0$, this will be understood to be the first time that the merchandise reaches a temperature equal to the lower temperature threshold $T_L$, i.e. $T_0$=T($t_0$)=$T_L$.

In one embodiment, the microchip can be reprogrammed and reused at a later time such that data memory is erased, the real time clock is reset, and the algorithm is changed or reprogrammed.

The temperature sensor can be a digital or analog sensor and can be included in a microelectromechanical systems (MEMS) device on the microchip. The temperature sensor can comprise thermocouples, thermistors, resistance temperature detectors, infrared sensors, surface acoustic wave RFID sensors, or the like. The temperature sensor can be a contact or noncontact type sensor.

The microchip is powered by the power source 80 and is also in communication with the communication apparatus 60 and the indicator 70 via connections 51. The microchip is configured to control the functions of the indicator 70, and optionally the functions of the communication apparatus 60. The microchip is configured to communicate the recorded information to the communication apparatus, such that the communication apparatus can communicate the information to a separate computing device 20 for manipulation by the computer application 10.

In one embodiment, the microchip records time only when the tracked temperature is above or below a recommended temperature for the product, as determined by the algorithm. For example and as shown in FIG. 8, the product's recommended temperature 331 ranges between the lower temperature threshold (e.g. 0° C.) and the upper temperature threshold (e.g. 8° C.), such that when the temperature sensor in the microchip tracks a temperature above the upper temperature threshold and/or below the lower temperature threshold, the microchip records the time. In one aspect, a cumulative time recorded by the microchip and associated with the product being above the upper temperature threshold (e.g. 8° C.) and exceeding the upper temperature time threshold (e.g. 14 days), is the basis for the algorithm in the microchip to cause the indicator 70 to display an unacceptable product indication. In another aspect, a cumulative time recorded by the microchip and associated with the product being above the extreme upper temperature threshold (e.g. 15° C.) and exceeding the extreme upper temperature time threshold (e.g. 1 day), is the basis for the algorithm in the microchip to cause the indicator 70 to display an unacceptable product indication. In another aspect, a cumulative time recorded by the microchip and associated with the product being below the lower temperature threshold (e.g. 0° C.) and exceeding the lower temperature time threshold (e.g. 14 days), is the basis for the algorithm in the microchip to cause the indicator 70 to display an unacceptable product indication. If the time-temperature threshold is not exceeded, the algorithm in the microchip causes the indicator 70 to display an acceptable product indication. It will be understood that the various aspects of this embodiment can be combined, wherein the algorithm in the microchip is configured to parse out the various time-temperature information associated with the upper, the extreme upper, and the lower temperature thresholds such that the information for each is separately considered as the basis for the algorithm in the microchip to cause the indicator 70 to display an unacceptable product indication. As applied to any of these aspects, the algorithm in the microchip may optionally include an adjustable delay for the start of recording the time, for example a delay of up to about 12 hours.

In one embodiment, the status displayed by the indicator 70 is able to be changed automatically by the control of the microchip 50 according to the algorithm contained in the microchip, or upon manually depressing a switch on the label so that the indicator 70 displays an unacceptable product indication, for example a blinking light signal. In another embodiment, the indicator can be manually changed (e.g. by a press-button) from an unacceptable product indication back to the original acceptable product indication. Optionally, there may be a fixed number of times, a variable number of times, or an unlimited number of times that the indicator can be changed between the acceptable and unacceptable product indication.

In another embodiment, the microchip continually records the time, and optionally the temperature, beginning from actuation of the label. In this embodiment, the algorithm in the microchip may be configured to parse out the continually recorded time and temperature, from the recorded time associated with the upper, the extreme upper, and the lower temperature time thresholds, which were previously described.

In several embodiments, the microchip is configured, to stop recording time and temperature when the temperature of the label returns to the recommended temperature range 331, or when an unacceptable product indication has been displayed by the indicator.

The microchip is configured to cause the indicator 70 to display an unacceptable product indication in the event that a time-temperature threshold for the product has been exceeded; in the event that the power source cannot adequately power the label; or in the event that the recording capabilities of the microchip are inactive. In another embodiment, the label may be used as a timer label, wherein the microchip is configured to cause the indicator 70 to display an alert or other indication, in the event that a particular predetermined time frame or cycle has elapsed or has been exhausted. For example, the microchip may be configured to change the status of the indicator to display a secondary status, or alternatively an initial status when a time interval has elapsed, for example, when seven days has passed. In one aspect, the indicator can be manually or automatically reverted to indicate an initial status, e.g. an acceptable product indication, for another seven-day cycle or other time interval or cycle length as desired. The number of times that the indicator can be reverted to indicate an initial status, e.g. an acceptable product indication, may be limited or unlimited. In one embodiment, the indicator may be reverted from the secondary status to the initial status, or vice versa, by manually depressing or otherwise triggering a switch or button on the label. The manually operated switch or button can be flexible or rigid. In one aspect, the timer label can be disposable, and have an inactive shelf-life of about 2 years, and an operational life of about 36 days, for example. The timer label may be operational at temperatures from about 36° F. to about 120° F. The predetermined time interval may be programmable (e.g., selected or adjustable) after assembly of the label, or may be pre-set during assembly of the label.

The microchip is configured to communicate the recorded information, through the communication apparatus, to the computing device for manipulation by the computer application. In this regard, the microchip is in communication and can at least partially control the communication apparatus for communicating the information to the computing device.

It is also envisioned that the microchip 50 may include a biomarker sensor for authentication applications, including the sensing of inks with engineered DNA, or the sensing of biomarkers in a secretion, including perspiration, generated from/induced by edible substances or pills taken into an organism. Further, the microchip 50 may include a microfluidic lock with destructive channels that can be applied for verifications, including the Yes/No verification. Still further, the microchip 50 may include a mineral sensor for traceability, including the farm-to-table traceability or a particle counter for monitoring and recording the amount of particles, or the amount and size of particles, of the ambient environment.

Still further, the microchip may include sensors configured to detect, without limitation, acceleration, vibration, shock; acoustic/ultrasonic/mechanical waves; chemical/gas; electric/magnetic energy; fluid flow; force/load/torque/ strain; humidity/moisture; leak/level; machine vision; electromagnetic waves, including visible light, ultraviolet radiation, infrared radiation, radio waves, microwaves, x-rays and gamma rays; motion/velocity/displacement; position/presence/proximity; pressure; temperature; biologics; biomarker, including DNA; radar; turbidity; presence of minerals; bodily excretions, including sweat; heartbeat, including the heartbeat signatures; radiation, including the radiation sensitive inks; chemical sensors, including phosgene, and chemicals in solid, liquid and gas; particles, including aerosol particles, liquid particles, and solid particles. Accordingly, the visual indicator 70 may show indications triggered by one or combinations of the aforementioned sensor functions provided by the microchip 50 with programmable thresholds for such triggers.

Communication Apparatus

In several embodiments, the label 30 may include a communication apparatus 60 for communicating the information recorded on the microchip 30 to a computing device 20 that is separate and independent from the laminated label. The communication apparatus 60 has a size and form suitable for incorporating into the label, and to the product and its packaging. The communication apparatus 60 may be included in the component layer 49 and connected to the microchip 50 via electrical connections 51 as shown in FIG. 3. The communication apparatus transfers the information stored in the microchip, to a computing device 20 for manipulation by the computer application.

The communication apparatus may be may be provided in the label with or without including the indicator 70 in the label. More specifically, the label can include one or both of the indicator 70 and the communication apparatus 60, such that the label may communicate the status of the product. If the communication apparatus is included in the label, then the status of the product may be assessed using the computing device and computer application.

The communication apparatus of the present subject matter is not particularly limited, and in one embodiment includes a high frequency ("HF", ISO standard 15693, ISO/IEC 14443 Type A & B), radio frequency identification ("RFID") component, an ultra-high frequency ("UHF", EPC Class 1 Gen 2, ISO/IEC 18000-6) RFID component, a Bluetooth component, a Bluetooth low energy (BLE, Bluetooth 4.0) component, or a wireless local area network (WLAN & Wi-Fi) component that is configured to wirelessly communicating the recorded information to a separate computing device 20. Such wireless platform may be supported by the microchip 50 or an additional wireless microchip & antenna system connected to the microchip 50. In one aspect, the radio frequency identification component comprises a near field communication apparatus (i.e. NFC tag).

In open commercial environments, an end user, or any other person along the chain of distribution for the product, can use an NFC enabled device to interrogate the NFC electronic tag in label, in order to receive a variety of useful content and information.

Typically, interrogation is performed by "tapping" the NFC tag using an NFC mobile device such as a smart phone. General content which can be delivered to the mobile device includes the information relating to the product that is recorded on the microchip. Often, other unique identifying information associated with the product is stored on the microchip besides the recorded data, such as information associated with the manufactured product including a batch number, serial number or the like. This information can be used for a variety of logistical or regulatory uses. This information is referred to herein as "item variable data" ("IVD") and can be captured digitally, for example with the use of a vision system and electronically stored in a database as a reference to the specific product.

The recorded information will be manipulated by the computer application and displayed on the mobile device, along with the identifying information relating to the product.

NFC is a set of short range wireless communication technologies, typically requiring a distance of 20 cm or less between the NFC enable device and the NFC tag. NFC operates at 13.56 MHz on ISO/IEC 18000-3 air interface and at rates ranging from 106 kbit/s to 424 kbit/s. NFC involves an initiator device and a target device. The initiator actively generates an RF field that can power a passive target. This enables NFC targets to take very simple forms, such as labels, stickers, key fobs, or cards that do not require batteries. NFC peer-to-peer communication is possible, provided both devices are powered.

NFC tags can access data and are typically read-only, but may be rewriteable. They can be custom encoded by their manufacturers or can use the specifications provided by the NFC Forum, an industry association charged with promoting the technology and setting key standards. The NFC Forum defines four types of tags that provide different communication speeds and capabilities in terms of configurability, memory, security, data retention and write endurance. Tags currently offer between 96 and 4,096 bytes of memory.

As with proximity card technology, near-field communication uses magnetic induction between two loop antennas located within the near field of each of the initiator and the target devices, effectively forming an air-core transformer. Near-field communication operates within the globally available and unlicensed radio frequency ISM band of 13.56 MHz. Most of the RF energy is concentrated in the allowed ±7 kHz bandwidth range, but the full spectral envelope may be as wide as about 1.8 MHz when using ASK modulation. Supported data rates include 106, 212 or 424 kbit/s (the bit rate 848 kbit/s is not compliant with the standard ISO/IEC 18092).

There are two modes for NFC. In a passive communication mode, the initiator device provides a carrier field and the target device answers by modulating the existing field. In this mode, the target device may draw its operating power from the initiator-provided electromagnetic field, thus making the target device a transponder. In an active communication mode; both initiator and target device communicate by alternately generating their own fields. A device deactivates its RF field while it is waiting for data. In this mode, both devices typically have power supplies. As described herein, the present subject matter typically involves an NFC-enabled (or HF-enabled) device as an initiator, and an unpowered NFC tag incorporated into the label, which is attached to a product, and/or on related packaging as a target. Hence communication occurs via a passive mode, wherein the communication apparatus 60 is not required to be powered by the power source 80. However, the present subject matter also includes systems using an active communication mode wherein the communication apparatus 60 is powered by the power source 80 and controlled by the microchip 50. In several embodiments, the embedded microchip 50 supports all NFC-enabled devices and NFC standards, including the ISO14443A and ISO15693 standards.

In certain embodiments of the present subject matter, a system as described herein is provided for products, or items using labels having NFC communication capabilities. Generally, one or more NFC-enabled tags are incorporated into the laminated label 30 and affixed to a product or packaging for the product. In many embodiments of the present subject matter, upon interrogation of an NFC tag by an NFC computing device, information recorded on the microchip is communicated to the NFC computing device for manipulation by the computer application. The manipulated information is then displayed on the computing device to indicate if the time-temperature threshold has been exceeded.

In other embodiments, the NFC function of the label 30 is able to provide information to the NFC computing device related to the authenticity of the product, such as information that the product is from a particular manufacturer or distributor. Further, the NFC function of the label may also provide marketing information relating to the product that is contained in the package having a label 30, or marketing or identifying information relating to the manufacturer or distributor of the product.

In certain embodiments, a database or other record retention means on one or more central computers 21 is updated upon an NFC computing device or other high frequency-enabled device interrogating the NFC tag in the laminated label. In a particular embodiment of the present subject matter, the NFC tag also transmits a directing Uniform Resource Locator (URL) or other information to the mobile device. Upon communication between the mobile device 20 and the database in the central computer 21, information regarding the product is transferred from the device 20 to the central computer 21, and the database is updated. Record(s) of the transfer and/or update are optionally established.

In yet another example of documenting a series of important events there are supply systems, such as food, that require monitoring in order to assure that critical practices during the chain of events are conducted and documented. The use of NFC can enable the creation of a trail of events, such as taking temperature of frozen food shipping containers, or by uploading an interaction between a mobile device and a database established for tracking events. Time and date stamps occurring during the interrogation of the NFC tag along with the user's device identification can be used as an assessment of proper handling. Once the information, along with the time date and user ID is uploaded to the database, such information represents a permanent and unalterable record of a product's history in a supply chain. Further, unlike passive devices that record and store time and temperature information for uploading at the completion of the journey, the mobile device can require that the user input a personal ID code or other secure information that provides active accountability that the proper actions were taken.

There are currently systems that utilize bar codes, and in some cases RFID devices, to track physical items such as is used by the US Postal Service. The readers used for this kind of service are usually special purpose readers that are provided to employees authorized to scan items and record such things as time and date. Although satisfactory in certain aspects, a need remains for a more flexible and user-friendly tracking system.

The present subject matter enables a broader set of users to interact with objects or documents of interest. In the case of pharmaceuticals for example, it would be impractical and/or expensive for a manufacturer to issue special readers to all distributors, doctors, patients, and others involved in the delivery and use of the product. By using near field communications, anyone with an HF-enabled mobile phone can interrogate the label, thereby reducing the complexity of the reading device.

In certain embodiments, when interrogated by an enabled phone, such as a smart phone for example, an NFC tag in the label uploads a specialized directing URL (Uniform Resource Locator or web address) to the phone. As known, the URL is a specific character string which can be recognized by a web browser program. The connection is established through conventional and known mobile telecommunications network(s) to a secure database. In addition, information about the specific phone being used, its location, time/date, and additional information may optionally be passed along to the site of the URL establishing a record of the point of contact in the database of the central computer. By using electronic signature technology, such as is available from companies such as DocuSign, a secure linkage can be created between the record contained in a secure database and the product which cannot be stored in a secure electronic database.

Bar code technology could potentially be used as the directing instruction for the mobile phone. This can be accomplished by QR codes for example. The use of bar codes requires that the code be visually acceptable to the phone. However, in many instances, due to lighting or other environmental conditions, the codes may not be effectively read. NFC does not require that any environmental conditions be met and therefore can be more effective. And because the only necessary condition of use is that the mobile device be in close proximity to the NFC tag, it can be quicker and easier to use and offers an improvement to bar code technology. In many circumstances, bar code technology may be an appropriate directing instruction but lacks some of the memory storage and other capabilities of electronic NFC technology.

Exemplary embodiments utilizing data transfer may allow for the transmission of data from a device, such as a radio frequency identification (RFID) tag or other device capable of transmitting data, for example utilizing near field communication (NFC), such as a NFC RFID tag. In some further exemplary embodiments, a computing device, which may be a mobile phone, a smart phone, tablet, PC or other device with a scanner or reader, may be capable of reading a NFC RFID tag, collecting information and data from the microchip, through the NFC RFID tag, and to a user of the mobile device executing the computer application. Further, the computer application can redirect a user to a particular server, database, website, or software application.

Indicator

In several embodiments, the label 30 of the present subject matter may include one or more indicators for communicating information regarding the status of the product. The indicator may be provided in the label with or without including the communication apparatus 60 in the label. More specifically, the label can include one or both of the indicator 70 and the communication apparatus 60, such that the label may communicate the status of the product. If the indicator is included in the label, then the status of the product may be assessed by simply looking at the indicator on the label.

The indicators can be in the component layer, such as indicator 70, or on the facestock layer, such as indicator 71 shown in FIG. 3. The one or more indicators provide visual indication regarding the status of the product. The indication can be permanent visual indication, or dynamic visual indication. By permanent visual indication, it is meant a visible display that once actuated to a secondary status does not revert to the initial status unless the indicator is reset. In one embodiment, the initial status of the indicator comprises an acceptable product indication, comprising an indication that the time-temperature threshold of the product has not been exceeded and that the product is suitable for its intended use. Further, the secondary status of the indicator comprises an unacceptable product indication by displaying that the time-temperature threshold of the product has been exceeded. By the term "dynamic visual indication," it is meant a visual display that shows the current status of the associated product and changes when the current status of the product changes. In one embodiment, the current status of the product comprises the current temperature of the product, wherein the dynamic visual indication shows the current temperature of the product and changes as the current temperature changes.

Permanent visual indication can include light emitting diodes that are turned on or off to indicate the status of the associated product. Dynamic visual indication can include thermochromic or electrochromic ink that provides or indicates a current temperature of the associated product. One or both of these types of indicators can be incorporated on the face stock, or can be incorporated in the label such that they are visible through the face stock.

The one or more indicators that may be included in the label provide a convenient visual reference indicating the status, including the current status, of the associated product. For example, when the permanent visual indication of the indicator 70 is not actuated to a secondary status (i.e. displays an initial status), then it can be easily determined by looking at the label that the associated product is acceptable for use. Also, by referencing the dynamic visual indication of the indicator 71, the current temperature of the associated product can easily be determined. When the permanent visual indication has been actuated to a secondary state, wherein an unacceptable product indication is triggered, it can be determined that the time-temperature threshold of the product has been exceeded and the product can be rejected. As previously mentioned and in one embodiment, the indicator can be reverted from the secondary status (unacceptable product indication) back to the initial status (acceptable product indication), for example by manually triggering a switch or other component on the label, or by communicating a command to the microchip to accomplish the same. Further, the microchip may be programmed to limit the number of time the indicator can be reverted between the initial status and the secondary status.

In one embodiment, the label can provide other visual, audible, tactile, or other sensory indication regarding the status of the product in lieu of, or in combination with the visual indication. In one example, the label provides an audible beeping sound to indicate that the time-temperature threshold of the product has been exceeded.

The indicator 71 on the facestock can comprise thermochromic or electrochromic ink, dye, or pigment for indicating the current temperature of the associated product, i.e. dynamic visual indication of the status of the product. Thermochromic inks, pigments, or dyes are temperature sensitive compounds that change color in response to a change in temperature. The indicator 71 can comprise more than one thermochromic ink, dye, or pigment, such that changes to the temperature of the product through various temperature ranges can be indicated. Electrochromic inks are inks that reversibly change color in response to an electrical charge being applied to the ink. Other types of indicators can be used for the indicator 71 on the facestock.

The indicator 70 in the component layer 49 can comprise a flexible or a rigid light emitting diode ("LED") or liquid crystal display ("LCD") underneath or positioned directly below the window 42 in the face stock 40 such that the LCD or LED indicator 70 is visible through the window 42 in face stock, from the front 36 of the label 30. The indicator 70 included in the component layer 49, can provide the permanent visual indication through a change in color or opacity of the indicator 70. In one embodiment, the indicator comprises a flexible component. One such flexible indicator is an LCD electronic skin, available from Kent Displays, Inc, 343 Portage Blvd, Kent, Ohio 44240, USA. The LCD electronic skins are thin (approximately 65 microns) and flexible for incorporation into a flexible label in accordance with the present subject matter, and can maintain either the initial status or the secondary status as the visual indication without power from the power source. This particular type of LCD is known as a bi-stable, or reflex LCD. Reflex, or bi-stable LCDs can display both a bright reflecting state and a dark non-reflecting state without requiring power to maintain the states, and can thereby indefinitely retain a displayed image without requiring power. Only a minimal amount of power is required to change the displayed image, for example when changing between the acceptable product indication and the unacceptable product indication. Other types of indicators can be used for indicator 70. In one embodiment, the indicator 70 comprises a flexible component. One such flexible indicator is an electrochromic display, including the poly(3,4-ethylenedioxythiophene) poly (styrenesulfonate) (PEDOT:PSS) conductive polymers, available from Acreo Swedish ICT AB, Box 787, Norrkoping, SE-601 17, Sweden. In another embodiment, the indicator comprises a rigid, i.e. non-flexible, component as the indicator. Alternatively or additionally, the indicator 70 includes a thermochromic material, such as thermochromic inks, films, coatings or thermal paper, in single or multiple layers, that overlays a conductive material, such as metal foils (including aluminum foils and copper foils) or conductive inks (including silver inks and carbon inks), and the conductive material can act as a resistive heating element that induces the color change for the indicator 70. The indicator 70 may also include an electrochromic material, such as electrochromic inks, films, coatings, or displays, in single or multiple layers, that may include layers of conductive materials, transparent electrodes, and electrolytes in addition to or as an alternative to the poly(3,4-ethylenedioxythiophene) poly(styrenesulfonate) (PEDOT:PSS) for inducing the color changes for the indicator 70.

The indicator 70 may display the secondary status when a time-temperature threshold of the product has been exceeded, when the battery is low on power, when the sensors are faulty, or when certain amount of time has been exceeded. The indicator may be reset to the initial status a limited or unlimited number or times, by using a press-button on the label or by communicating such a command to the microchip using the computing device, for example. Other means to reset the display of the indicator to the initial status may be used.

Power Source

The label also includes a power source 80 to power the various components of the label. In one embodiment, the power source is configured to provide power for operating the microchip 50, the indicator 70, and in one aspect, the communication apparatus 60, and the electrochromic or thermochromic ink 71 included on the face stock 40. In one embodiment, the power source 80 is capable of powering the label 30 and the associated functions thereof for at least 3 years of active operation, including the functions of temperature sensing, time-temperature data logging and computation, and visual indication.

The power source is not particularly limited, and can include a battery, a photovoltaic cell, or other suitable power source for powering the microchip, the indicator, and optionally the communication apparatus for peer-to-peer NFC communication. In one aspect, the power source is a battery, either a one-time use battery, or a rechargeable battery. The power source can comprise a flexible component, such as a flexible battery. For example, the power source can comprise a flexible printed battery having a thickness of about 500 microns, available from Blue Spark Technologies, 806 Sharon Drive, Suite G, Westlake Ohio 44145 USA. In this embodiment, the flexible battery is included with other flexible or rigid components and layers to comprise a flexible label, such that the label can be applied to various substrates having contoured surfaces. The power source can also include a RFID induce power source, such as a magnetic coupling and backscatter power source. In another embodiment, the power source can comprise a rigid, i.e. non-flexible, component which can be included with other flexible or rigid components and layers to comprise a label.

If the laminated label is intended to be reusable and reconfigured for different types of products, the power source can be a rechargeable battery or photovoltaic cell, such that the battery can be recharged or reused for a different product after an initial use of the label.

In one embodiment, the laminated label is actuatable either before or after being applied to a product or associated packaging. In other words, the power source is initially not providing power to the various components of the label, but upon actuation, delivers power for operating the components. An electrical connection between the power source and one of the microchip, the communication apparatus, and the indicators can be made upon actuation of the label. Actuation of the label when desired, ensures that power provided by the power source is conserved until the label is actuated for use. In this embodiment, the lifespan of the label is extended because the power in the battery is not being drained before the label is applied to a product.

In one embodiment, the power source 80 may be physically connected to the various components of the label device by one or more electronic circuits, through which the power source provides power to the one or more components (e.g. the microchip 50, the communication apparatus 60, and the indicator 70). In one aspect, the embedded electronic circuitry includes a non-conductive strip separator or a press-switch, or other circuit interrupting mechanism that can be used to selectively connect and/or disconnect the power source from the various components of the label. In this way, power stored in the power source can be conserved by using the press-switch or non-conductive strip separator to selectively connect or disconnect the power source to the various label components as desired. For example, the press-switch or non-conductive strip separator can be used to disconnect the power source from the various components of the label when the label is not being used. In this example, the various components of the label will be prevented from drawing power from the power source when disconnected therefrom, such that electrical leakage from the power source will be prevented or minimized. When it is desired to use the label, the press-switch or non-conductive strip separator can be used to connect the power source to the various components of the label for powering the components.

In one embodiment, the power source and various components are physically connected or disconnected by the embedded electronic circuitry of the label through manually depressing the press-switch or by removing a non-conductive strip separator from the circuitry.

Adhesive Layers

In one embodiment, and as depicted in FIGS. 2-3, the label 30 includes one or more adhesive layers 90. The adhesive layers are used to laminate the various components and layers together to form the laminated label, and the bottom adhesive layer is used to adhere the label to a substrate, such as to the product or to packaging for the product.

The label includes adhesive layers, such as depicted in FIG. 2, between various layers of the laminated label in order to hold the laminated layers together. As shown in FIG. 2, three adhesive layers 90 are included in the laminated label, two of which are used to laminate the various layers of the label together, and the bottom adhesive layer configured to adhere the label to a substrate. The adhesive layer at the bottom 37 of the label 30 is used primarily for attaching the laminated label to a product or associated packaging. For clarity, FIG. 3 only shows this bottom adhesive layer and omits the other adhesive layers used to laminate the components and layers of the label together. The laminated label can include more or less adhesive layers as that depicted in FIGS. 2 and 3.

The adhesives used in the one or more adhesive layers 90 of the laminated label are not particularly limited and can include various pressure sensitive adhesives, drying adhesives, contact adhesives, hot melt adhesives, reactive adhesives, or the like including combinations thereof. In one embodiment, the various adhesive layers of the laminated label comprise pressure sensitive adhesive (PSA). In one aspect, the label comprises a pressure sensitive adhesive label, capable of being applied to a substrate simply by pressing the bottom adhesive layer against a substrate. The PSA is not particularly limited and can include a variety of polymers; for example, acrylic and methacrylic ester homo- or copolymers, butyl rubber-based systems, silicones, nitriles, styrene block copolymers, ethylene-vinyl acetate, urethanes, vinyl esters and amides, olefin copolymer materials, natural or synthetic rubbers, and the like. Other adhesives can be used; such as a polyurethane adhesive, a rubber adhesive, or the like.

The adhesive is not particularly limited as long as the adhesive is capable of sufficiently laminating together the various layers and components of the label and sufficiently adhering the label to a substrate. In one embodiment, the adhesive used is a flexible adhesive so as to maintain the flexibility of the laminated label.

Release Liner

The label may also include a release liner 100. In one embodiment, the release liner is a single- or multi-layer film material that is applied to cover the bottom adhesive layer, for protecting the bottom adhesive layer from premature exposure to contaminants or from being adhered to a substrate before intended. In one embodiment as depicted in FIGS. 2-3, the release liner covers the bottom adhesive layer, which is used to adhere the label to a substrate. The release liner can be removed from the laminated label in order to expose the bottom most adhesive layer, whereby the bottom adhesive layer can be placed in contact with the product or associated packaging and adhered thereto.

The release liner is not particularly limited and can include any material capable of being applied to and removed from the bottom adhesive layer without degrading the bottom adhesive layer, and inhibiting bonding of the label to a substrate. The release liner can include one or more additives or coatings to enhance certain attributes of the release liner, such as silicone or Teflon coatings to decrease bonding with the adhesive layer.

Computer Application

The time-temperature tracking and indicator system of the present subject matter may also include a computer application that is executable on a computing device and may be configured to manipulate the information stored in the microchip. The information stored in the microchip is communicated to the computing device by the communication apparatus, and is manipulated by the computer application by performing one or more operations or calculations on the information.

The computer application, and the operations performed by the computer application are not particularly limited. The operations can include one or more processes performed on the information, such that the manipulated information effectively communicates relevant facts relating to the suitability of the product for its intended use. The operations performed by the computer application can include those described herein as capable of being performed by the microchip.

The operations can include compiling the information, converting the information to a different format such as graphs or symbols, mathematical operations performed on the information, sequencing the information, arranging the information, statistical analysis of the information, generating an icon based on the information, and the like, along with combinations thereof.

The computer application is configured to be executable on the computing device 20, and is configured to cause the computing device to output useful data relating to the suitability of the product for its intended use. Output of useful data is not particularly limited and can comprise a printed document, a computer display on a computing device, or any other means that effectively communicated whether the time-temperature threshold of the product has been exceeded.

In one embodiment, the computer application is also configured to control the computing device to provide a visual, audible, or other sensory indication or combination thereof, relating to the status of the product.

A manufacturer or distributor of the product can provide a proprietary or common computer application to the computing device by download through the internet so that the computing device can access the recorded information in the microchip. Further in this aspect, the computer application can be revised at any point in time, to provide updates to the application. For example, the application can be updated to provide a different recommended temperature or time-temperature threshold for the product, even after the product has been shipped.

The computer application can be configured to provide one or more alerts via the computing device. The alerts can be output by the computing device to an end user of the product. In one aspect, the alert is provided when one or more of the following is satisfied:
a) the temperature of the product, or the temperature of an environment to which the product is exposed, is not at a recommended temperature or not within a recommended temperature range;
b) one or more predetermined time intervals (e.g. 7 days) have elapsed after the label is activated or after a first use of the product;
c) the time-temperature threshold of the product has been exceeded.

The alerts can comprise, for example, notification that it is time to take or consume the product (e.g. to take a medication), that the package or product is at room temperature (e.g. above an upper temperature threshold), or that it is time perform a task associated with the product (e.g. that it is time to monitor blood glucose levels in the event the product is diabetes medication).

In one embodiment, such as that depicted in FIG. 1, the computer application can also include a function for communicating manipulated information from a plurality of computing devices 20 to a database stored on one or more central computing devices 21. In this embodiment, the various computing devices 20 that communicate directly with individual labels 30 via communication channels 120, can in turn communicate with a central computing device 21 via communication channels 121 to update or contribute to a database of information associated with the product. Thereby, the central computing device 21 can compile all of the information associated with all of the labels 30 into the database and can compile a universal report associated with all the labels 30. In this embodiment, all the information associated with a particular lot of manufactured product can be compiled in one database and analyzed for various purposes. This could be beneficial for example, to manufacturers who are trying to streamline their delivery system for a product, or to manufacturers who are collecting data on the transportation, delivery, or use of their product.

In a further embodiment, it is envisioned that a collection of individual labels 30 can work together as a temperature mapping network that each of the individual label 30 nodes can measure data in evenly or non-evenly time separations apart from one and other. The time separations can increase the overall data resolution recorded in the group of label 30 nodes in close proximity or distant spatial arrangements. For example, assume there are four label 30 nodes in a network, the 1st label will start the logging at time zero, and the 2nd label will start the logging at time=15 min, the 3rd label will start the logging at time=30 min, and the 4th label will start the logging at time=45 min, and all the labels will record one data point per hour; hence, the network will be able to provide the overall temperature measurement of data in every 15 minutes.

Computing Device

In accordance with the present subject matter, the system may include a computing device configured to wirelessly communicate with the label so as to access the information recorded in the microchip. The computing device of the present subject matter can include one or more computing devices. The one or more computing devices can include mobile devices, such as smart phones or the like, or proprietary devices such as label readers provided specifically to read a particular label from a particular manufacturer. In one embodiment, the computing device has NFC capabilities, such that passing the computing device in proximity to the label, or vice versa, allows the computing device to communicate with the label and access the information stored in the computer chip. In one embodiment, the computing device comprises one or more mobile phones equipped as NFC-enabled devices. It will be understood that in accordance with the present subject matter, the computing device can scan one or more labels and the system can include one or more computing devices, as shown in FIG. 1. In another embodiment, the computing device may have UHF RFID capabilities, wherein the computing device may have an antenna/reader for more distant communication with the label than that provided in NFC enabled devices. Further the UHF RFID enabled device may be able to communicate with multiple labels in rapid succession, for example by reading labels at approximately 0.1 seconds/label.

The computing device is configured to execute the computer application, and can thereby communicate with the label having a communication apparatus, and thereby access the information recorded and stored in microchip. The information received from the label is then manipulated by the executed application on the computing device. The computing device can then display the manipulated information, or other data, for analysis as to whether the product is suited for its intended use.

In one embodiment, and based on the manipulated information, the computing device displays an indication on the status of the associated product. That is, the display indicates if the product is suited for its intended purpose and if the time-temperature threshold of the product has been exceeded.

The computing device of the present subject matter is not limited to mobile devices and can comprise any device that is capable of the function of executing the computer application, the function of communicating with the laminated label(s), and the function of displaying output of the computer application as the status of the product. In this regard, the computing device can comprise more than one computing device, wherein each function, or portion thereof, is performed by one or more separate computing devices.

In one embodiment, a mobile device communicates with one or more central computing devices, such that the manipulated information, or unmanipulated information, is transmitted for updating a database associated with the product, as depicted in FIG. 1. The database of information can, for example, be accessible to the manufacturer or distributor of the product, or to anyone (including end users) who is provided access to the database. All the information related to the product can thereby be compiled and assessed to determine the current or historical status of the product. This can assist the manufacturer, for example, to streamline transportation, improve manufacturing of the product, or improve instructions on how to handle or use the product.

In yet another embodiment, it is also envisioned that the computing device may add variable information to the microchip 50, or add variable information by covert, overt or both forms of printing on the facestock 40 of the label 30.

Packaging

In accordance with the present subject matter, the product having a time-temperature threshold may be included in various types of packaging for shipping, advertising, protection, identification, and the like. The packaging of the present subject matter is not particularly limited. In accordance with the present subject matter, the packaging for the product can include a bottle, a box, an envelope, or other type of container or combination thereof. It is also contemplated that the packaging does not need to fully surround the product, and can simply include a tag attached to the product.

Figure 5:
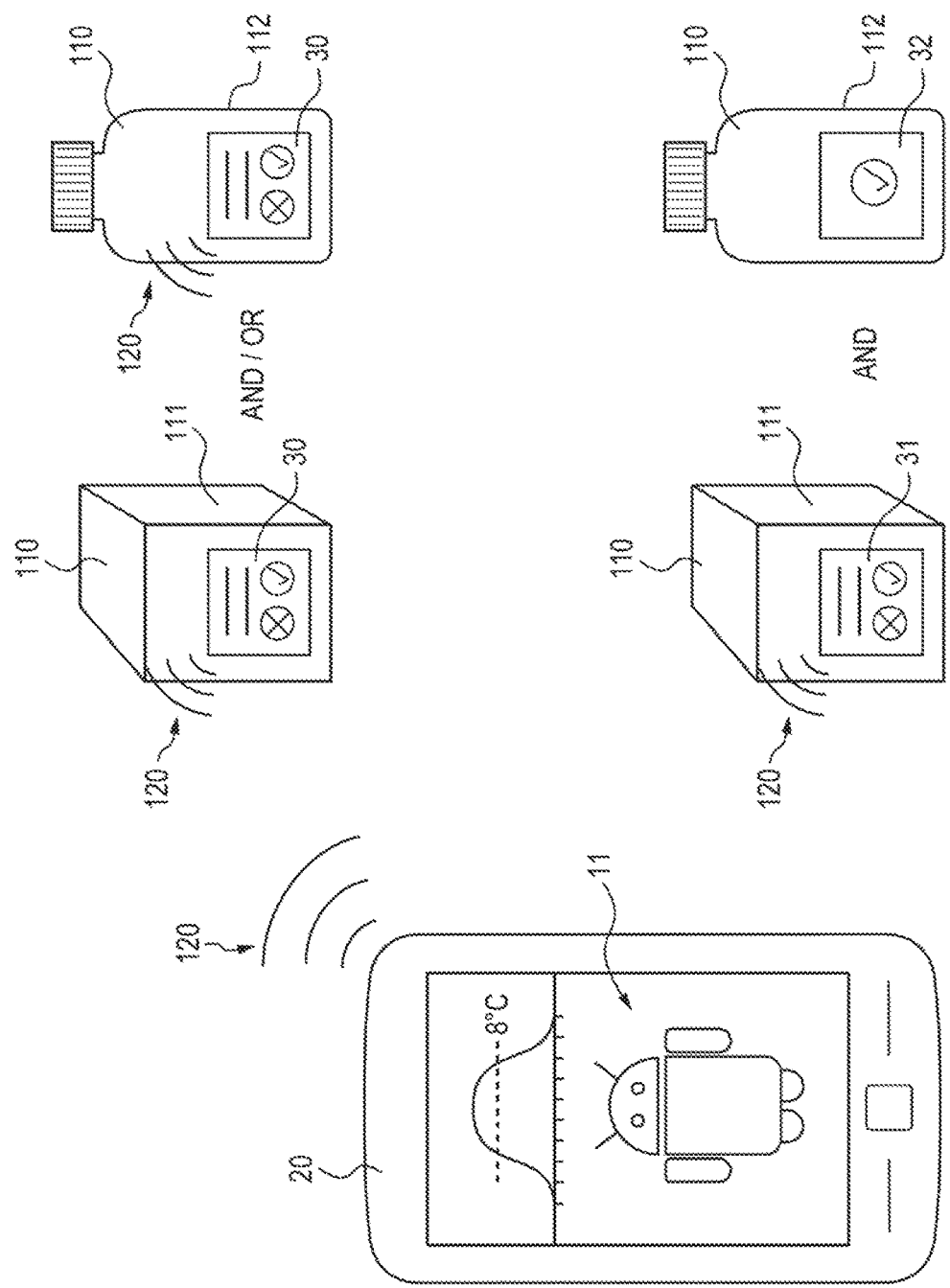
FIG. 5 is a schematic diagram of a time-temperature tracking system in accordance with the present subject matter.

In one embodiment, as depicted in FIG. 5, the packaging 110 includes both an outer portion 111, e.g. a box, and an inner portion 112, e.g. a bottle. In such circumstances, or in various other circumstances, the laminated label 30 can include a label system comprising two or more labels.

A first label 31 can be attached to the outer portion 111 of the packaging 110, and/or the inner portion 112 of the packaging 110 as shown in the top half of FIG. 5. In another aspect, the first laminated label 31 can be attached to the outer portion 111 of the packaging, while a second laminated label 32 can be attached to the inner portion 112 of the packaging. In the bottom half of FIG. 5, the first laminated label 31 is secured to the box, while the second laminated label 32 is secured to the bottle.

One or more of the first 31 and second 32 labels can communicate 120 via communication channels with the computing device 20 having the computer application being executed thereon. The computing device 20 can communicate 120 with one or more of the first 31 or second 32 labels and displays the output 11 of the computer application on the screen of the computing device 20 for indicating the current status of the product.

In one embodiment in accordance with the present subject matter, the first label 31 includes a communication apparatus for communicating 120 with the computing device 20. This first label is referred to herein as a "smart label" such that the label can transmit information to the computing device for manipulation by the computer application. The second communication label 32 does not communicate with the computing device 20. In this aspect, the second label does not comprise a communication apparatus, and simply provides an indication comprising whether the time-temperature threshold of the product has been exceeded.

This label system configuration may be useful where a plurality of inner packages 112 are placed in a single outer package 111 for shipment, wherein the product is first separated into a plurality of bottles (i.e. inner packages 112) and then the plurality of bottles are placed into a box (i.e. outer package 111) for shipment. In such circumstances, the first label 31 is able to communicate the information associated with the product on behalf of the more than one inner package 112. Accordingly, in some regards to cost or other considerations, it may not be desirable for the label on the inner packages 112 to include a communication apparatus, such that a communication apparatus in the second label is not necessary for indicating if the product's time-temperature threshold has been exceeded.

Life Cycle and Methods

Figure 6:
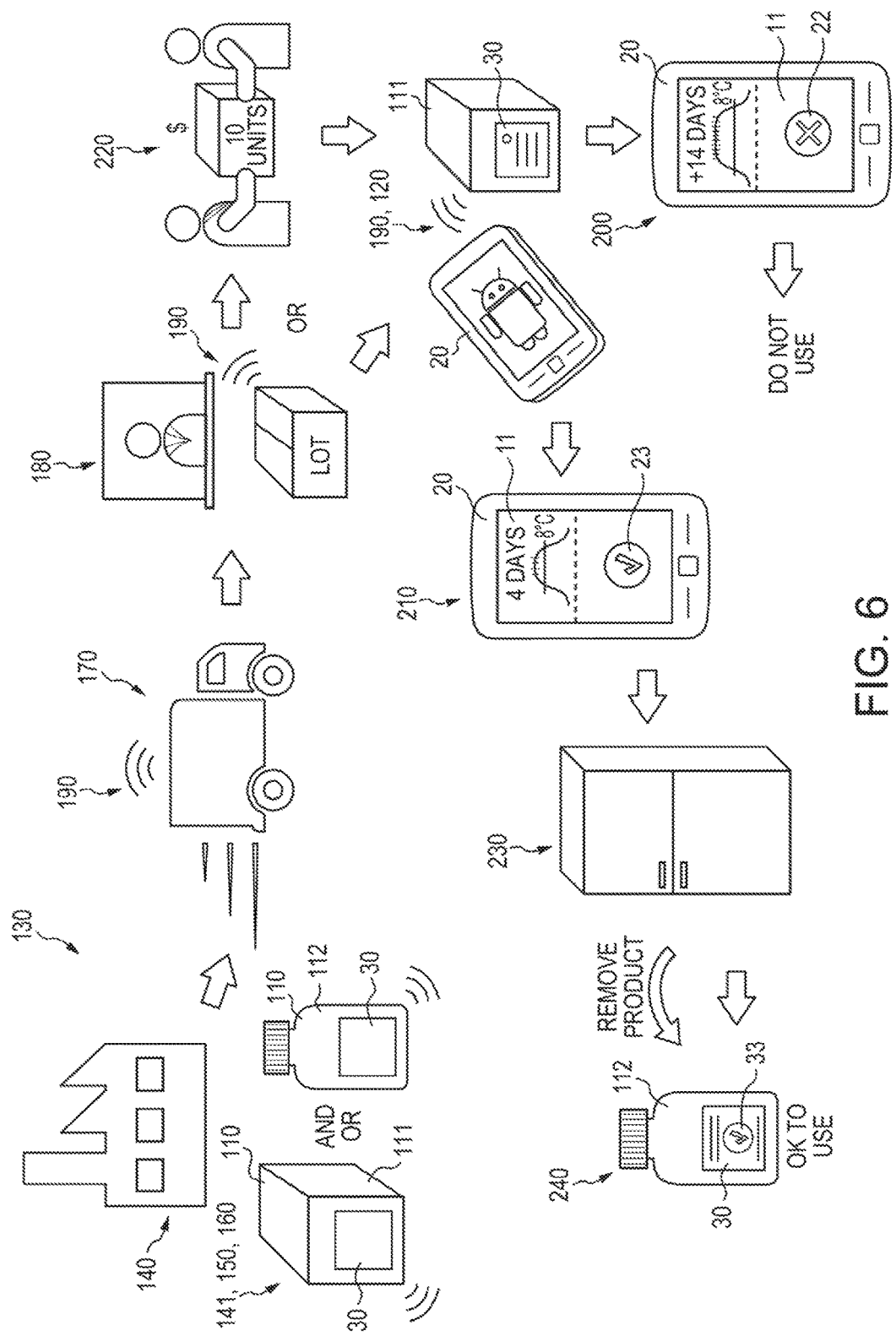
FIG. 6 is a schematic diagram of a life cycle of a product having a laminated label associated therewith, in accordance with the present subject matter.

An exemplary life cycle of a product, in a method of use in association with the time-temperature tracking and indicating system of the present subject matter, is depicted in FIG. 6. In the exemplary life cycle 130, the product is manufactured 140 at a production facility and packaged 141 and labeled 160 by attaching a laminated label 30 to the packaging 110 for the product; to either or both of the inner packaging 112 or the outer packaging 111. The label is activated 150, in order that the battery powers the various components of the label, such that the information relating to the product can be tracked, recorded, and communicated. The label 30 can be activated 150 either before or after being attached 160 to the packaging 110 for the product. In one aspect, the label may be activated by pulling an activation tab, or by pressing a button on the label, for example.

The life cycle 130 also includes transporting 170 the product, and delivering 180 the product to a retailer or other distributor. After delivery 180, the product can be maintained for a period of time by the retailer in the original packaging 110 having the label 30, or can distributed 220 to an end user.

The status of the product can be monitored 190 by either the retailer or the end user at any stage, as shown. It will be understood that monitoring 190 the status of the product can include communication 120 between the label and a computing device that is executing the computer application, and/or can include simply looking at the label to determine if the visual indicator shows that the time-temperature threshold of the product has been exceeded. It will be understood that when the label includes the communication apparatus 60, that the current status of the product may be assessed by communication between the label and the computing device. It will also be understood that when the label includes the indicator 70, that the current status of the product may be assessed by looking at the indicator on the label. In one embodiment, the label includes the communication apparatus and does not include the indicator. In another embodiment, label includes the indicator and does not include the communication apparatus. In still another embodiment, the label includes both of the communication apparatus and the indicator.

Where the label includes the communication apparatus, monitoring 190 may include scanning 120 the smart label 30 on the outer packaging 111 and either accepting 210 or rejecting 200 the product. If the output 11 of the computer application displays an unsuitable product indication 22 on the computing device 20, the product will be rejected 200 because the time-temperature threshold of the product has been exceeded. If the output 11 of the computer application displays a suitable product indication 23 on the computing device 20, the product will be accepted 210 because the time-temperature threshold of the product has not been exceeded. The product may then be stored 230 in a proper environment, such as a refrigerator for example, in order to prevent or inhibit the time-temperature threshold of the product from being exceeded. When desired, the product may be removed from storage and consumed or used 240, as long as the label 30 on the inner packaging 112 displays an acceptable product indication 33 by the indicator, showing that the time-temperature threshold of the product has not been exceeded.

It is envisioned that the communication apparatus may also allow device-to-device communications between the individual and groups of label 30 to form a wireless sensor network (WSN) by wireless personal area network (WPAN) technologies, such as ZigBee and IEEE standard 802.15.4, which the WSN includes the proximity sensing for applications in vehicular automation.

During transport 170, delivery 180, distribution 220, and storing 230, it will be understood that the product may be stored in an environment such that the time-temperature threshold of the product will not be exceeded.

Figure 7:
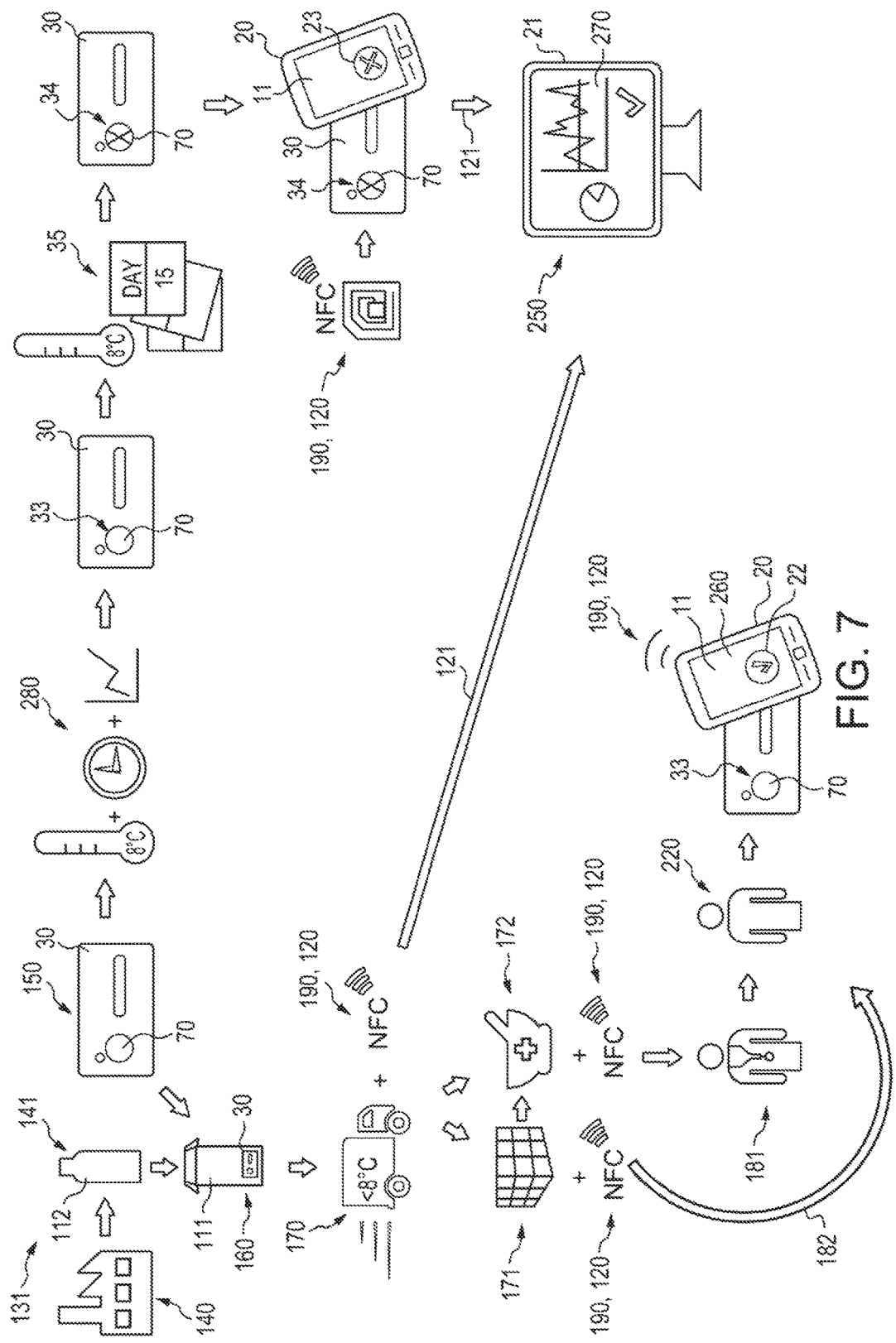
FIG. 7 is a schematic diagram of a life cycle of a pharmaceutical product having a laminated label associated therewith, in accordance with the present subject matter.

In another exemplary embodiment, the life cycle of a pharmaceutical product, in a method of use in association with the time-temperature tracking and indicating system of the present subject matter is depicted in FIG. 7. The pharmaceutical product has a time-temperature threshold, comprising for example, an upper temperature threshold of 8° C. and an upper temperature time threshold of 14 days. In other words, if the product is exposed to a temperature above 8° C. for a cumulative period of time greater than 14 days, the product will be unsuitable for use by an end user. The present subject matter is not limited to such time-temperature thresholds but can include other temperature thresholds, other time thresholds, and other conventions used for the time-temperature threshold as desired for a specific product.

In the exemplary life cycle as depicted in FIG. 7, the product is manufactured 140 at a production facility and packaged 141 into one or more packaging components 111, 112. The packaging includes for example a bottle and a box, into which the bottle is inserted. Thereafter, a laminated label 30 is activated 150 and applied 160 to the outer portion 111 of the packaging, i.e. the box.

It will be understood that in accordance with the present subject matter, the label can be applied also to the bottle, or directly to the product. The label is then monitored 190 at various stages during the life cycle 131, and such monitoring is accomplished by scanning the label with a computing device 20 to communicate 120 with the label 30, and by visually monitoring the indicator 70 on the label. In this embodiment, the pharmaceutical medication is transported 170 and scanned 120 with the computing device 20 for data collection at each step of the transportation process.

The data communicated 120 from the labels to the computing device can be transmitted 121 to a database, for example a database on a central computing device 21, in order to compile a report 270 on the product or lot of the product. The product is then transported 170 for either wholesale distribution 171 or for pharmaceutical distribution 172, and monitored 190 (including scanning 120) with a computing device. The product can be delivered to an end user by doctor administration 181 or prescription, or directly 182 from the wholesale distribution to the end user. The end user then receives the product and can monitor 190, 120 the status of the product by accessing information stored within the label 30 through a computing device 20, and by assessing the visual indicator 70 on the label. The pharmaceutical can be used or consumed as recommended, as long as the indicator 70 on the label has an acceptable product indication 33, or the computing device 20 displays a suitable product indication 22.

In this aspect, the end user can also receive alerts 260 after a time interval as previously described, communicated from the microchip to the computing device of the end user. These alerts can include an indication when it is time to consume or use the product, when the product is not measuring at the recommended 331 temperature, or an indication that a certain task should be performed in relation to the medication, for example, instructions for an end user to track glucose levels.

FIG. 7 also depicts that during the life cycle 131, the product is exposed to environmental conditions which are tracked and recorded 280. When the exposure does not exceed the time-temperature threshold of the product, the indicator 70 on the label 30 will be in an initial status and display an acceptable product indication 33. When the threshold is exceeded 35, such that the product has been exposed to temperatures over 8° C. for more than 14 days, the indicator 70 on the label 30 will be actuated to a secondary status and display an unacceptable product indication 34. Further, by scanning 120 the label with a computing device 20, the computing device will indicate an unsuitable product indication 23 as the output 11 of the computer application. The scanned information can be communication to a database, for example a database on a central computing device 21, where the data will be collected 250 and compiled into a report 270 on the production lot.

If the product is exposed to time and temperature variables that do not exceed the time-temperature threshold, and the label includes an indicator 70, then the label may visually indicate that the product is acceptable for use. If the time-temperature threshold has been exceeded, the label will visually indicate that the product is unacceptable for use.

When the label includes a communication apparatus 60, the label may be configured to communicate the recorded information to the computing device, thereby indicating that the product is unsuitable for use. The computing device will display the output of the computer application as a visual indication to the end user that the product should not be consumed or used for its intended purpose. During each stage of monitoring, the information communicated to the computing devices can be thereafter transferred to a central computing device, which can be accessible by the manufacturer in order to prepare a report on the production lot of the product. Such means of communication between the individual computing devices and the central computing device of the manufacturer are depicted in FIG. 7 by communication channels 121.

Among the applications in which the label 30 may be used include in military uses that the visual indicator 70 can provide health and life signs or friend-enemy identifications;

as a data-carrier sticker device, including functions similar to the flash memory; as an add-on and removable NFC-enable sensor label for smartphones; in surveillance and intelligent labels; as behavior monitor labels, including the use as driving data loggers/monitors for behavior-based insurance programs; as behavior/condition monitors for rental services, including the on-demand, short term or peer-to-peer rentals of cars and bikes; in multiple sensors configurations, including the sensors to improve the reliability of modality for medical imaging; in waste management; in vendor management, including the uses as sensors for plastic pellets tank level and the trigger mechanism for re-orders at the vendor end; and as detectable sensors for autonomous driving.

Many other benefits will no doubt become apparent from future application and development of this technology.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:

1. A time-temperature tracking and indicator system for a pharmaceutical product having a time-temperature threshold, the system comprising a label, a computing device, and a computer application, wherein:
    the time-temperature threshold comprises an upper temperature threshold, an extreme upper temperature threshold, and a lower temperature threshold;
    the label is configured to be attached to at least one of the product and packaging for the product, the label including:
    a facestock comprising printed indicia, wherein the facestock has a thickness from about 10 to about 100 microns,
    a microchip configured to store information associated with the product, the information including at least one of time data and temperature data associated with the product, wherein the microchip is configured to record time only when a temperature threshold is exceeded;
    a communication apparatus configured to wirelessly communicate the information stored in the microchip to the computing device,
    an indicator configured to display an initial status and a secondary status, and to provide a permanent visual indication as the secondary status for indicating that the time-temperature threshold of the product has been exceeded, wherein the indicator comprises at least one of a liquid crystal display (LCD), thermochromic ink, and electrochromic ink and
    a power source for powering the microchip, the indicator, and optionally the communication apparatus; and
    the computer application is executable on the computing device and configured to create manipulated information by performing operations on the information communicated to the computing device by the communication apparatus, and to output the manipulated information to indicate if the time-temperature threshold of the product has been exceeded;
    wherein the indicator is visible through the facestock.

2. The system of claim 1, wherein the manipulated information is output to the computing device and is displayed by the computing device.

3. The system of claim 1, wherein the communication apparatus comprises a radio frequency identification (RFID) tag and the computing device comprises an RFID reader.

4. The system of claim 3, wherein the RFID tag comprises a passive near field communication (NFC) tag and the computing device comprises an active RFID reader for interrogating the NFC tag in the label.

5. The system of claim 1, wherein the computing device comprises a hand-held mobile device and the computer application is executable on the hand-held mobile device.

6. The system of claim 1, wherein the microchip actuates the indicator to provide the permanent visual indication when the time-temperature threshold of the product has been exceeded.

7. The system of claim 1, wherein the indicator is further configured to provide a visual indication of a current temperature of the product, or of an environment to which the product is exposed.

8. The system of claim 1, wherein the indicator comprises a liquid crystal display and the liquid crystal display provides the permanent visual indication when the time-temperature threshold of the product has been exceeded.

9. The system of claim 1, wherein the facestock, the microchip, the communication apparatus, the indicator, and the power source are in contact with an adhesive to form the label.

10. The system of claim 9, wherein the adhesive comprises a pressure sensitive adhesive (PSA).

11. The system of claim 1, wherein the label further comprises an adhesive layer for adhering the label to the packaging, wherein the adhesive layer comprises a pressure sensitive adhesive (PSA).

12. The system of claim 11, wherein the label further includes a release liner removably covering the adhesive layer.

13. The system of claim 1, wherein the microchip is configured to continuously store and compute the information associated with the product after activation.

14. The system of claim 1, wherein the indicator is configured such that the secondary status can be selectively reset to the initial status.

15. The system of claim 1, wherein the indicator comprises an electrochromic display.

16. The system of claim 1, wherein the indicator is configured to provide an indication when a predetermined time interval has elapsed.

17. The system of claim 1, wherein:
    the label comprises a first label,
    the system further comprises a second label, the second label including:
    a facestock, and
    an indicator attached to the facestock and configured to provide visual indication that the time-temperature threshold of the product has been exceeded; and
    the first label is attached to an outer portion of the packaging, and
    the second label is attached to an inner portion of the packaging.

18. The system of claim 1, wherein the computer application is configured to store an elapsed time after a first use of the product.

19. The system of claim 1, wherein the computer application is configured to provide an alert when at least one of the following is satisfied:
    a. the temperature of the product, or the temperature of an environment to which the product is exposed, is not at a recommended temperature or not within a recommended temperature range, and b. one or more predetermined time intervals have elapsed after the first use of the product.

20. A method of determining if a time-temperature threshold of a perishable pharmaceutical product has been exceeded, the method comprising:

providing a time-temperature tracking and indicator system comprising an activatable label and a computer application, the label comprising a facestock comprising printed indicia, wherein the facestock has a thickness from about 10 to about 100 microns, a microchip, a communication apparatus, an indicator, and a power source for powering the microchip, the indicator, and optionally the communication apparatus, wherein the indicator comprises at least one of a liquid crystal display (LCD), thermochromic ink, and electrochromic ink;

activating the label such that the microchip records information associated with the product only when a temperature of the product, or a temperature to which the product is exposed, is not at recommended temperature or not within a recommended temperature range, the information including at least one of time data and temperature data associated with the product, and the microchip actuates the indicator to provide a permanent visual indication when the time-temperature threshold of the product has been exceeded;

attaching the label to at least one of the product and packaging for the product, wherein the indicator is visible through the facestock;

establishing communication between the communication apparatus and a separate computing device whereby the information recorded in the microchip is wirelessly communicated to the computing device;

executing the computer application on the computing device whereby the computer application creates manipulated information by performing operations on the information communicated to the computing device, the computer application outputs the manipulated information to the computing device, and the computing device displays the manipulated information; and assessing at least one of the indicator and the manipulated information displayed on the computing device in order to determine if the time-temperature threshold of the product has been exceeded;

wherein the time-temperature threshold comprises an upper temperature threshold, an extreme upper temperature threshold, and a lower temperature threshold.

21. The method of claim 20, wherein the communication apparatus comprises a passive near field communication (NFC) tag and the computing device comprises an active RFID reader such that the information is wirelessly communicated when the active RFID reader interrogates the NFC tag.

22. The method of claim 20, wherein the computing device comprises a hand-held mobile device and the computer application is executed on the hand-held mobile device.

23. The method of claim 20, wherein the indicator is further configured to provide a visual indication of a current temperature of the product, or of an environment to which the product is exposed.

24. The method of claim 20, wherein the indicator comprises the liquid crystal display and the liquid crystal display provides the permanent visual indication when the time-temperature threshold of the product has been exceeded.

25. The method of claim 20, wherein the facestock, the microchip, the communication apparatus, the indicator, and the power source are in contact with an adhesive to form the label.

26. The method of claim 25, wherein the adhesive comprises a pressure sensitive adhesive (PSA).

27. The method of claim 20, the label comprises an adhesive layer for adhering the label to the packaging, wherein the adhesive layer comprises a pressure sensitive adhesive (PSA).

28. The method of claim 27, wherein the label includes a release liner removably covering the adhesive layer and wherein the attaching includes adhering the label to the packaging by removing the release liner from the label to expose the adhesive layer and contacting the adhesive layer to the packaging.

29. The method of claim 20, wherein:

the label is a first label, the first label being attached to an outer portion of the packaging;

the system further comprises a second label, the second label including:

a facestock, and an indicator attached to the facestock and configured to provide visual indication that the time-temperature threshold of the product has been exceeded; and the method further comprising attaching the second label to an inner portion of the packaging.

30. The method of claim 20, wherein the computer application is configured to record an elapsed time after a first use of the product.

31. The method of claim 20, wherein the microchip is configured to record the elapsed time after the first use of the product, and wherein the indicator is configured to provide a visual indication of the elapsed time after the first use of the product.

32. The method of claim 20, wherein the computer application is configured to provide an alert on the computing device when at least one of the following is provided:

a. the temperature of the product, or the temperature of an environment to which the product is exposed, is not at the recommended temperature or within the recommended temperature range, and b. one or more predetermined time intervals after the first use of the product have elapsed.

33. A method of compiling information relating a perishable pharmaceutical product contained in a series of packages and having a time-temperature threshold, the information including at least one of time data and temperature data associated with the perishable product, the method comprising:

providing a time-temperature tracking and indicator system comprising a plurality of labels and a computer application executable on a computing device, the labels each comprising a facestock comprising printed indicia, wherein the facestock has a thickness from about 10 to about 100 microns, a microchip, a communication apparatus, an indicator, and a power source for powering the microchip, the indicator, and optionally the communication apparatus, wherein the indicator comprises at least one of a liquid crystal display (LCD), thermochromic ink, and electrochromic ink;

attaching one of the labels to each package in the series of packages; wherein the indicator is visible through the facestock;

activating the labels such that the microchip records information associated with the product only when a temperature of the product, or a temperature to which the product is exposed, is not at a recommended temperature or within a recommended temperature range, the information including at least one of time data and temperature data associated with the product, and the microchip actuates the indicator to provide a permanent visual indication when the time-temperature threshold of the product has been exceeded;

establishing communication between the computing device and the communication apparatus, whereby the information recorded in the microchip is wirelessly communicated to the computing device; and executing the computer application on the computing device whereby the information communicated to the computing device is communicated to a database to thereby compile the information relating to the product contained in the series of packages;

wherein the time-temperature threshold comprises an upper temperature threshold, an extreme upper temperature threshold, and a lower temperature threshold; and further wherein the microchip is configured to record time only when a temperature threshold is exceeded.

34. The method of claim 33 wherein the computing device comprises a plurality of computing devices.

35. The method of claim 33, wherein the communication apparatus comprises a passive near field communication (NFC) tag and each of the computing devices comprises an active RFID reader such that the information is wirelessly communicated when the active RFID reader interrogates the NFC tag.

36. The method of claim 33, wherein the computing device comprises a hand-held mobile device and the computer application is executed on the hand-held mobile device.

37. The method of claim 33, wherein each of the labels includes a release liner removably covering an adhesive layer, and wherein the attaching includes removing the release liner to expose the adhesive layer and bringing the adhesive layer into contact with a package.

38. The method of claim 33, wherein at least one of the microchip in each of the labels and the computer application is configured to record an elapsed time after a first use of the product.

39. A time-temperature tracking and indicator label for a pharmaceutical product having a time-temperature threshold, the label comprising:

a facestock comprising printed indicia, wherein the facestock has a thickness from about 10 to about 100 microns, a microchip configured to store information associated with the product including at least one of time data and temperature data associated with the product, a communication apparatus configured to wirelessly communicate the information stored in the microchip to a computing device, an indicator configured to provide a permanent visual indication that the time-temperature threshold of the product has been exceeded, wherein the indicator comprises at least one of a liquid crystal display (LCD), thermochromic ink, and electrochromic ink, and a power source for powering the microchip, the indicator, and optionally the communication apparatus;

wherein the label is configured to be attached to at least one of the product and packaging for the product;

wherein the indicator is visible through the facestock;

wherein the time-temperature threshold comprises an upper temperature threshold, an extreme upper temperature threshold, and a lower temperature threshold; and wherein the microchip is configured to record time only when a temperature threshold is exceeded.

40. The label of claim 39, wherein the communication apparatus comprises a radio frequency identification (RFID) tag.

41. The label of claim 39, wherein the RFID tag comprises a passive near field communication (NFC) tag.

42. The label of claim 39, wherein the microchip stores the information when a temperature of the product, or a temperature of an environment to which the product is exposed, is not within a recommended temperature range of the product.

43. The label of claim 39, wherein the microchip actuates the indicator to provide the permanent visual indication when the time-temperature threshold of the product has been exceeded.

44. The label of claim 39, wherein the indicator is further configured to provide a visual indication of a current temperature of the product, or of an environment to which the product is exposed.

45. The label of claim 39, wherein the indicator comprises the liquid crystal display and the liquid crystal display provides the permanent visual indication when the time-temperature threshold of the product has been exceeded.

46. The label of claim 39, wherein the facestock, the microchip, the communication apparatus, the indicator, and the power source are in contact with an adhesive to form the label.

47. The label of claim 46, wherein the adhesive comprises a pressure sensitive adhesive (PSA).

48. The label of claim 39, wherein the label further comprises an adhesive layer for adhering the label to the packaging, wherein the adhesive layer comprises a pressure sensitive adhesive (PSA).

49. The label of claim 48, wherein the label further includes a release liner removably covering the adhesive layer.

50. A time-temperature tracking and indicator system for a pharmaceutical product having a time-temperature threshold, the system comprising a label, and packaging for the product, wherein the label is attached to the packaging, the label including:

a facestock comprising printed indicia, wherein the facestock has a thickness from about 10 to about 100 microns, a microchip configured to store information associated with the product including at least one of time data and temperature data associated with the product, a communication apparatus configured to wirelessly communicate the information stored in the microchip to a computing device, an indicator configured to provide a permanent visual indication that the time-temperature threshold of the product has been exceeded, wherein the indicator comprises at least one of a liquid crystal display (LCD), thermochromic ink, and electrochromic ink, and a power source for powering the microchip, the indicator, and optionally the communication apparatus;

wherein the indicator is visible through the facestock;

wherein the time-temperature threshold comprises an upper temperature threshold, an extreme upper temperature threshold, and a lower temperature threshold; and further wherein the microchip is configured to record time only when a temperature threshold is exceeded.

51. The system of claim 50, wherein the packaging comprises an inner packaging and an outer packaging, wherein the label is attach to at least one of the inner packaging and the outer packaging.

52. The system of claim 50, wherein the communication apparatus comprises a passive near field communication (NFC) tag.

53. The system of claim 50, wherein the microchip actuates the indicator to provide the permanent visual indication when the time-temperature threshold of the product has been exceeded.

54. The system of claim 50, wherein the label comprises a first label, the system further comprising a second label, the second label including:
 a facestock, and
 an indicator attached to the facestock and configured to provide visual indication that the time-temperature threshold of the product has been exceeded;
 wherein the first label is attached to the outer packaging, and
 wherein the second label is attached to the inner packaging.

* * * * *